United States Patent
Matsumoto et al.

(10) Patent No.: US 7,659,024 B2
(45) Date of Patent: Feb. 9, 2010

(54) FUEL CELL HAVING A SEPARATOR WITH WATER-RETAINING GROOVE PORTIONS

(75) Inventors: Toshihiro Matsumoto, Osaka (JP); Hiroki Kusakabe, Osaka (JP); Norihiko Kawabata, Osaka (JP); Yoshiki Nagao, Osaka (JP); Naoko Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 99 days.

(21) Appl. No.: 11/918,250

(22) PCT Filed: May 12, 2006

(86) PCT No.: PCT/JP2006/309563

§ 371 (c)(1),
(2), (4) Date: Oct. 11, 2007

(87) PCT Pub. No.: WO2006/121157

PCT Pub. Date: Nov. 16, 2006

(65) Prior Publication Data

US 2009/0023029 A1 Jan. 22, 2009

(30) Foreign Application Priority Data

May 13, 2005 (JP) .............................. 2005-140915

(51) Int. Cl.
*H01M 8/10* (2006.01)
*H01M 8/02* (2006.01)
*H01M 4/86* (2006.01)

(52) U.S. Cl. .............................. 429/30; 429/34; 429/41

(58) Field of Classification Search .................... 429/30, 429/34, 41
See application file for complete search history.

(56) References Cited

U.S. PATENT DOCUMENTS 6,329,094 B1   12/2001   Yasuo et al.

(Continued)

FOREIGN PATENT DOCUMENTS

DE   699 05 389 T2   12/2003

(Continued)

OTHER PUBLICATIONS

Patent Cooperation Treaty (PCT) International Preliminary Report on Patentability, issued Nov. 22, 2007 in International Application PCT/JP2006/309563.

(Continued)

*Primary Examiner*—Patrick Ryan
*Assistant Examiner*—Karie O'Neill
(74) *Attorney, Agent, or Firm*—Wenderoth, Lind & Ponack, L.L.P.

(57) ABSTRACT

In a fuel cell composed of a pair of separators with a membrane electrode assembly sandwiched therebetween, gas passages having a plurality of generally linear passage portions, and bent passage portions each of which makes one end portion of the linear passage portions communicated with the other end portion of the linear passage portions, are formed so as to be communicative from a gas introducing port to a discharge port. In inner wall surfaces of the groove portions of the separators constituting the linear passage portions, water-retaining groove portions capable of retaining inside thereof at least part of water generated in the gas passage are formed in such a grooved configuration as to be substantially continuous along the passage portion. As a water drop generated within the gas passage makes contact with retained water within the water-retaining groove portions, growth of the water drop is suppressed to avoid any blockage of the gas passage, by which the anti-flooding property is improved.

10 Claims, 22 Drawing Sheets

U.S. PATENT DOCUMENTS

| | | |
|---|---|---|
| 6,649,297 B1 | 11/2003 | Marchand et al. |
| 6,797,424 B2 | 9/2004 | Ooma et al. |
| 2004/0197633 A1 | 10/2004 | Yamamoto et al. |
| 2005/0214626 A1 | 9/2005 | Ohma |

FOREIGN PATENT DOCUMENTS

| | | |
|---|---|---|
| JP | 2-168565 | 6/1990 |
| JP | 11-204118 | 7/1999 |
| JP | 2000-123848 | 4/2000 |
| JP | 2002-343382 | 11/2002 |
| JP | 2003-100321 | 4/2003 |
| JP | 2003-249246 | 9/2003 |
| JP | 2004-241185 | 8/2004 |
| JP | 2004241185 A * | 8/2004 |
| JP | 2005-93244 | 4/2005 |
| JP | 2005093244 A * | 4/2005 |
| WO | 98/52242 | 11/1998 |
| WO | 00/30199 | 5/2000 |

OTHER PUBLICATIONS

International Search Report issued Jul. 18, 2006 in the International (PCT) Application of which the present application is the U.S. National Stage.

International Search Report issued Jul. 18, 2006 in the International (PCT) Application of which the present application is the U.S. National Stage.

* cited by examiner

FUEL CELL HAVING A SEPARATOR WITH WATER-RETAINING GROOVE PORTIONS

TECHNICAL FIELD

The present invention relates to a fuel cell using polyelectrolyte membranes which are used in portable power supplies, electric car-dedicated power supplies, home cogeneration systems and the like.

BACKGROUND ART

A fuel cell acts to make a hydrogen-containing fuel gas and an oxygen-containing oxidizer gas such as air electrochemically react with each other to produce electric power and heat concurrently. With regard to its structure, a catalytic reaction layer mainly composed of carbon powder carrying thereon a platinum-based metal catalyst is formed on both surfaces of a polyelectrolyte membrane which selectively transports hydrogen ions. A gas diffusion layer (e.g., carbon paper, carbon cloth, etc.) having both gas permeability and electron conductivity is formed on an outer surface of the catalytic reaction layer. This diffusion layer and the catalytic reaction layer (catalytic layer) are combined to provide electrodes. Generally, an electrode to which hydrogen is introduced is called anode (hydrogen electrode, or fuel electrode) while an electrode to which oxygen is introduced is called cathode (oxygen electrode, or air electrode).

Next, in order that fed fuel gas or oxidizer gas will not leak or that the fuel gas and the oxidizer gas will not mix together, a gas sealing material or gasket is placed around the electrodes so as to sandwich the polyelectrolyte membrane. This sealing material or gasket is to be integrally assembled preliminarily with the electrodes and the polyelectrolyte membrane, such an integrated assembly being called MEA (Membrane Electrode Assembly). Outside the MEA, separators are placed for mechanical fixation of the MEA and for electrical series connection of neighboring MEAs to each other. At portions of each separator at which it contacts the MEA, gas passages are formed to serve for the supply of reactant gas to electrode surfaces and for carry-off of produced gas and excess gas. Such gas passages may also be provided independently of the separators, but it is a common method that recessed groove portions are provided on the surfaces of the separators to serve as the gas passages.

The supply of fuel gas to this recessed portion requires piping jigs for branching piping for use of fuel gas supply into the number of separators in use and connecting their branching destinations directly into the recessed portions used for the formation of gas passages of the separators. These jigs are called manifolds, and one type of them that is connected directly from the above-described fuel gas supply piping is called external manifold. The manifold includes a type called internal manifold, which is simpler in structure. The internal manifold refers to those which are so designed to supply fuel gas directly to a hole provided in the separator having gas passages formed therein with inlet/outlet ports of the gas passages passing up to the hole.

Since the fuel cell generates heat during operation, the cells need to be cooled by cooling water or the like so as to be maintained in a successful temperature state. As a cooling part for giving a flow of cooling water in units of 1 to 3 cells is normally inserted between one separator and another separator, it is often the case that cooling water passages as the cooling part are provided in rear faces of the separators to provide the cooling water. These MEA and separator and the cooling part are stacked one on another alternately until, for example, 10 to 400 cells are stacked, and thereafter the stack is sandwiched by end plates via a current collector plate and an insulating plate, and further fixed from both ends with tightening bolts. This is a common structure of the stacked fuel cell (i.e., fuel cell stack).

The separator to be used for such fuel cells, e.g. PEFCs (Polymer Electrolyte Fuel Cells) needs to have high electrical conductivity, high airtightness to fuel gas, and high corrosion resistance, i.e. acid resistance to reactions involved in oxidation-reduction of hydrogen/oxygen. For these reasons, in the making of conventional separators, the groove portions to form the gas passages are formed on the surfaces of a glassy carbon plate or resin-impregnated graphite plate or the like by cutting work, or expanded graphite powder is set together with a binder into a press mold with the gas-passage use groove portions formed therein and then subjected to press working and heat treatment or the like.

Also, in recent years, an attempt to use stainless or other metal plates instead of conventionally used carbon material has been made. In the case of a separator using a metal plate, since the metal plate is exposed to a high-temperature oxidative atmosphere, corrosion or dissolution of the metal plate may occur over long-time use. Corrosion of the metal plate would cause the corroded portion to increase in electrical resistance, resulting in lowered power of the cell. Also, dissolution of the metal plate would cause dissolved metal ions to diffuse in the polyelectrolyte, those metal ions being trapped by ion-exchange sites of the polyelectrolyte. As a result, the ion conductivity of the polyelectrolyte itself would deteriorate. In order to avoid such deteriorations, it is common practice that the surface of the metal plate is gold-plated to some extent of thickness.

With the PEFC, it is generally practiced that a gas containing hydrogen as a fuel gas or a gas containing oxygen gas as an oxidizer gas is mixed with steam and supplied as such so that hydrogen ionized within the polyelectrolyte is mobilized. Meanwhile, because moisture (steam) is produced by combustion reaction during power generation, steam that mixes with the fuel or the oxidizer and moisture (steam) produced by power generation pass through the passage-formation groove portion formed in the separator. Although the surface of the separator in the inner wall surface of the groove portion is generally controlled to a constant temperature so that such steam or produced steam will not be condensed more than necessary, yet variations in the power consumption of generated power or in the fuel supply would cause the amount of generated heat inside the fuel cell to vary, so that the internal temperature would be varied or the amount of produced water would be vary.

For instance, in the case of lowered temperature or the like, the separator surface (inner wall surface of the groove portion) may be more liable to condensation, and it is practically impossible to completely eliminate such a phenomenon. With occurrence of condensation, there is a problem of occurrence of a voltage instability phenomenon (flooding) that water drops generated by the condensation block the gas passages, causing deficiencies of fuel supply to the electrodes and the catalyst located downstream of the place of the blockage, in which case the voltage decreases gradually, and further, discharge of the water drops causes the blockage of the gas passages to be released, so that the fuel supply is recovered, in which case the voltage is increased.

As the material of the conventional-type fuel-cell separator, impermeabilized matters processed from graphite blocks, anti-corrosion metals, or liquid resin-containing matters obtained from an expanded graphite sheet molded laminate impregnated and hardened with liquid resin are usually employed, but separators made of such materials are poor at hydrophilicity. Therefore, a method has conventionally been used that the hydrophilicity at the separator surface (i.e., inner wall surface of the groove portion) is improved so that the contact angle between water drops generated within the gas passages and the inner wall surfaces of the groove portions is lessened to suppress the growth of the water drops that block the gas passages and thereby prevent the blockage of the passages.

SUMMARY OF INVENTION

Problems to be Solved by the Invention

However, such surface treatment for improvement of hydrophilicity is comparatively higher in processing cost, which would one factor that inhibits production cost reduction for fuel cells as an issue. Further, the hydrophilicity improved by the surface treatment is liable to time deterioration along with the use of the fuel cell, which is problematic in terms of the durability of hydrophilicity.

Accordingly, an object of the present invention, lying in solving these and other issues, is to provide a fuel cell which is capable of avoiding the blockage of the gas passages due to water generated in the gas passages of the separator so that stable operability can be fulfilled and that the anti-flooding property can be enhanced.

Means for Solving the Subject

In order to accomplish these and other objects, the present invention has the following constitutions.

According to a first aspect of the present invention, there is provided a fuel cell comprising:

a membrane electrode assembly which is a composite member of a polyelectrolyte membrane, catalytic layers placed so as to sandwich the polyelectrolyte membrane, and gas diffusion layers placed outside the catalytic layers, respectively, and in which anode and cathode electrodes are formed; and a pair of separators in which gas-passage groove portions are so formed that their surfaces are brought into contact with the gas diffusion layers to form a gas passage, and which are so placed as to sandwich the membrane electrode assembly, wherein in each of the separators,
the gas passage comprises a plurality of generally linear passage portions disposed generally in parallel to one another, and a plurality of bent passage portions which make end portions of the linear passages communicated with end portions of their adjacent linear passage portions, where the gas-passage groove portions are formed so as to be communicative from a gas feed port to a discharge port, and wherein in inner wall surfaces of the gas-passage groove portions constituting each of the linear passage portions, water-retaining groove portions for retaining inside thereof at least part of water generated in the gas passage are formed in such a grooved configuration as to be substantially continuous along the linear passage portion.

According to a second aspect of the present invention, there is provided the fuel cell as defined in the first aspect, wherein the water-retaining groove portions are formed in the gas-passage groove portions constituting the linear passage portions, respectively, so as not to communicate with the discharge port.

According to a third aspect of the present invention, there is provided the fuel cell as defined in the first aspect, wherein the water-retaining groove portions are formed so as to be continued between the both end portions thereof in each of the linear passage portions, and the water-retaining groove portions are discontinuous with the bent passage portions.

According to a fourth aspect of the present invention, there is provided the fuel cell as defined in the first aspect, wherein the water-retaining groove portions are formed at bottom portions of the gas-passage groove portions, respectively.

According to a fifth aspect of the present invention, there is provided the fuel cell as defined in the fourth aspect, wherein the water-retaining groove portions are formed at generally central portions of the bottom portions, respectively.

According to a sixth aspect of the present invention, there is provided the fuel cell as defined in the first aspect, wherein the water-retaining groove portions are so formed as to have a function for, by making contact a water drop generated within the gas-passage groove portions with the retained water, decreasing a contact angle between an inner wall surface of the gas-passage groove portions and the water drop.

According to a seventh aspect of the present invention, there is provided the fuel cell as defined in the first aspect, wherein the water-retaining groove portions are so formed as to each have a width falling within a range of ½ to 1/10 of a width of each of the groove portions.

EFFECTS OF THE INVENTION

According to the present invention, in inner wall surfaces of the groove portions of the separators constituting the linear passage portions in the gas passages, water-retaining groove portions capable of retaining inside thereof at least part of water generated in the gas passages are formed in such a grooved configuration as to be substantially continuous along the linear passage portions. By adoption of this construction, as a water drop generated within the gas passage due to condensation of gas or the like makes contact with retained water within the water-retaining groove portions during its growth process, growth of the water drop enough to block the gas passage can be suppressed. Therefore, blockage of the gas passages due to such generation of water drops and their growth can be avoided with reliability, so that a stable gas supply can be realized. Thus, there can be provided a fuel cell capable of improving its anti-flooding property.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF PREFERRED EMBODIMENTS

Figure 1:
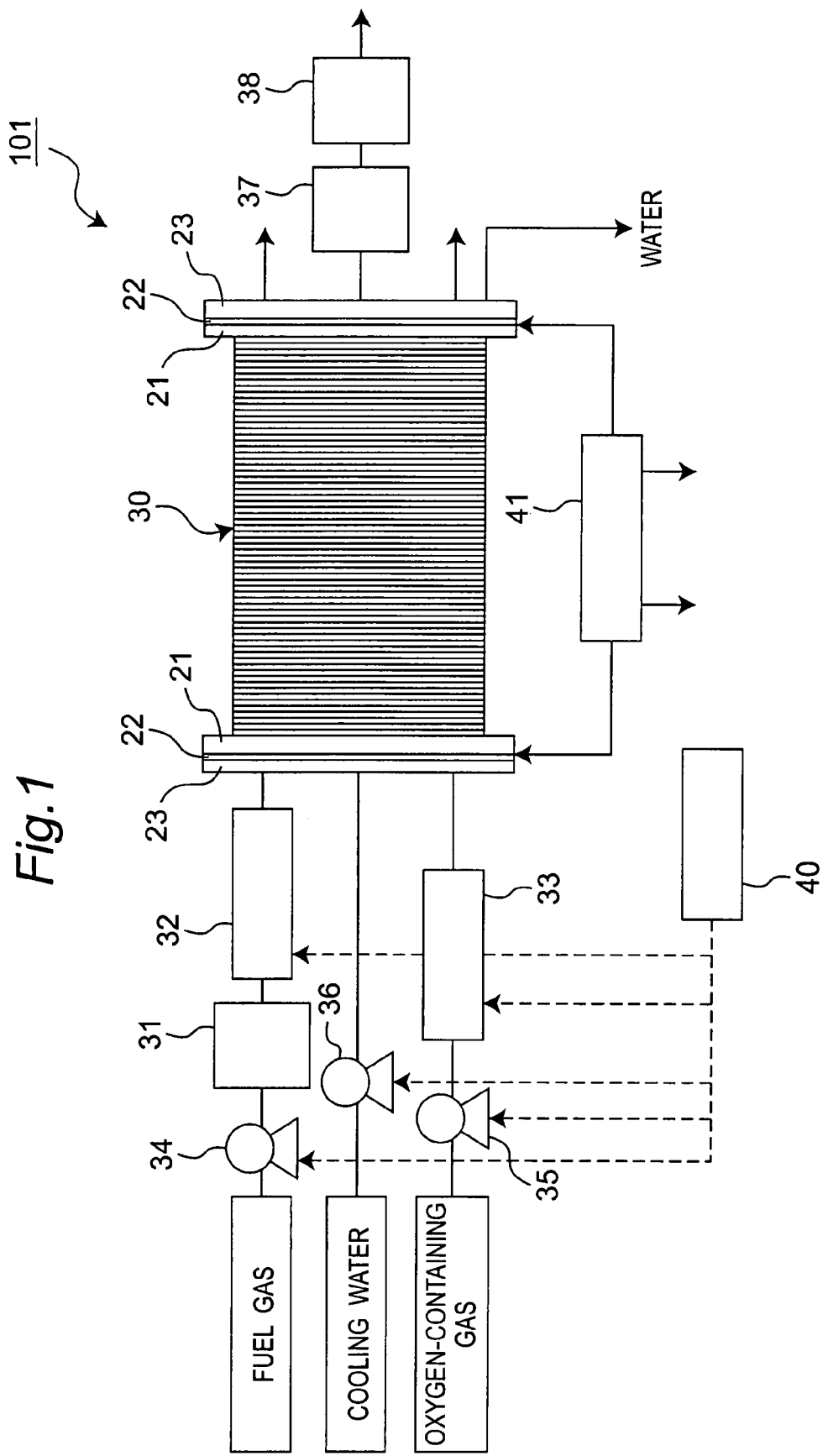
FIG. 1 is a schematic view showing a construction of a fuel cell according to one embodiment of the present invention.

Before the description of the present invention proceeds, it is to be noted that like parts are designated by like reference numerals throughout the accompanying drawings.

Hereinbelow, embodiments of the present invention will be described in detail with reference to the accompanying drawings.

Embodiment

A schematic constructional view showing a schematic construction of a fuel cell according to one embodiment of the present invention is shown in FIG. 1. Also, a schematic exploded view of a fuel-cell stack (hereinafter, referred to as a stack) included in the fuel cell 101 shown in FIG. 1 is shown in FIG. 2.

The fuel cell 101 is a polymer electrolyte fuel cell (PEFC), as an example, which works to make a hydrogen-containing fuel gas and an oxygen-containing oxidizer gas such as air electrochemically react with each other to produce electric power, heat and water at the same time. As shown in FIG. 1, the fuel cell 101 includes a stack 30 having a layer-stacked structure in which a plurality of fuel-cell use cells (or unit cells) each having an anode-and-cathode pair of electrodes are connected in series, a fuel processor 31 for extracting hydrogen from fuel gas, an anode humidifier 32 for humidifying hydrogen-containing fuel gas extracted by the fuel processor 31 to improve the power generation efficiency, a cathode humidifier 33 for humidifying oxygen-containing gas (oxidizer gas), and pumps 34, 35 for supplying fuel gas and oxygen-containing gas, respectively. That is, the fuel processor 31, the anode humidifier 32 and the pump 34 constitute a fuel feeder unit for feeding the fuel gas to the individual cells of the stack 30, while the cathode humidifier 33 and the pump 35 constitute an oxidizer feeder unit for feeding oxidizer gas to the individual cells of the stack 30. It is noted that the fuel feeder unit and the oxidizer feeder unit as shown above may also be provided in other various modes only if they have the function of feeding the fuel or the oxidizer.

The fuel cell 101 further includes a pump 36 for circulatively feeding cooling water for use of efficient removal of heat generated in the stack 30 during power generation, a heat exchanger 37 for subjecting the heat removed by the cooling water (e.g., a liquid having no electrical conductivity such as pure water) to heat exchange with a fluid such as tap water, and a hot water storage tank 38 for storing therein tap water subjected to the heat exchange. Furthermore, the fuel cell 101 has an operation control unit 40 for performing operation control for use of power generation while holding those individual constituent members associated with one another, and an electricity output unit 41 for extracting electricity generated in the stack 30.

Figure 2:
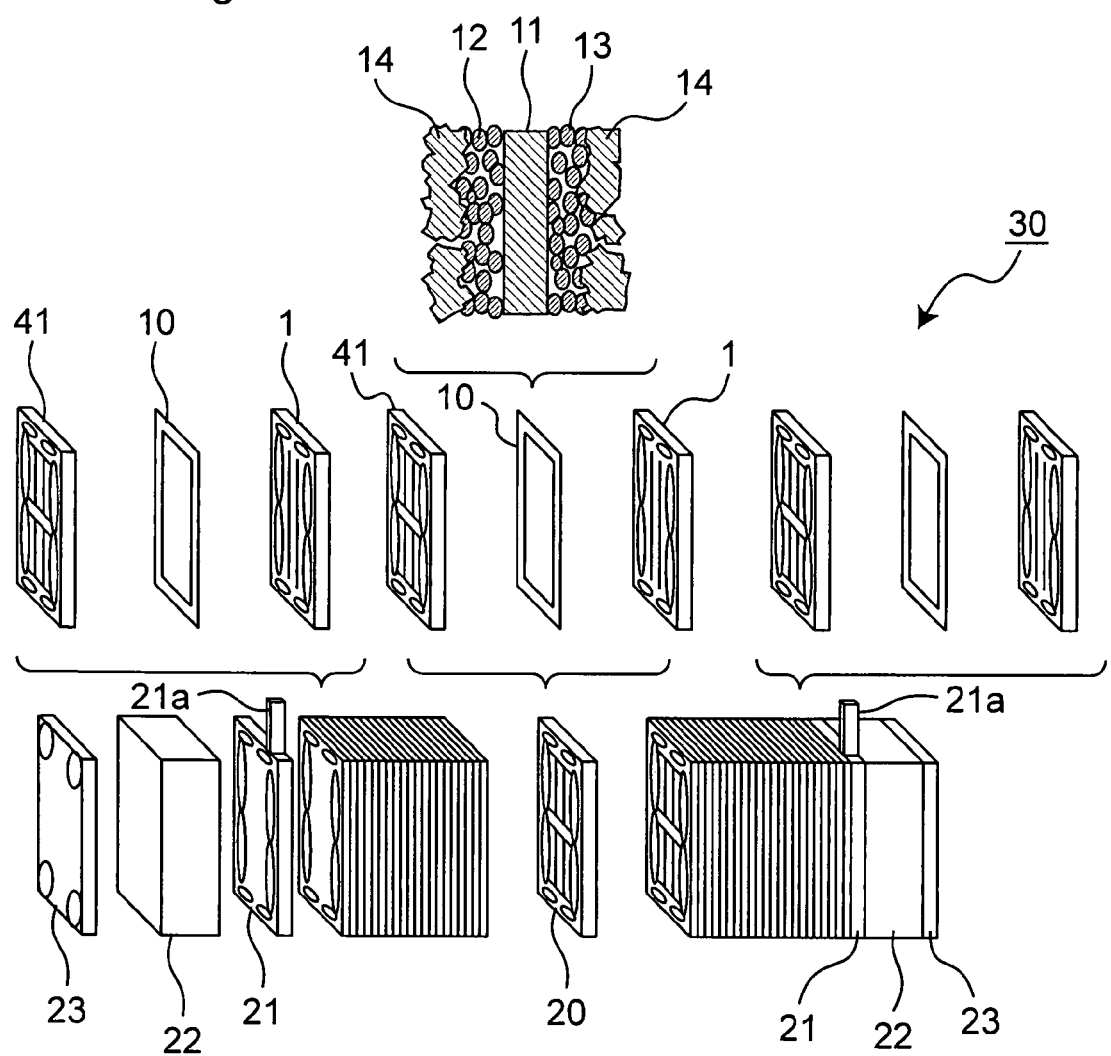
FIG. 2 is a schematic exploded view showing a construction of the stack in the fuel cell of FIG. 1.

As shown in FIG. 2, the stack 30 included in the fuel cell 101 is made up by stacking a plurality of unit cells (or cells) 20, each of which forms a fundamental unit structure, and by tightening current collector plates 21, insulating plates 22 and end plates 23 from both sides of the stack with a specified load. Each of the current collector plates 21 has a current-extracting terminal portion 21a, from which an electric current, i.e. electricity, is taken out during power generation. The insulating plates 22 insulate the current collector plates 21 and the end plates 23, respectively, from each other, and may, in some cases, be equipped each with unshown feed port and discharge port for gas and cooling water. The end plates 23 tighten and hold the plurality of stacked unit cells 20, the current collector plates 21 and the insulating plates 22 with a specified load by means of unshown pressurizing means.

As shown in FIG. 2, the or each unit cell 20 is made up by sandwiching an MEA (Membrane Electrode Assembly) 10 with a pair of separators 1 and 41. The MEA 10 is formed, for example, through the steps of forming a catalytic layer (anode-side catalytic layer) 12 composed mainly of carbon powder carrying thereon a platinum-ruthenium alloy catalyst on the anode side of a polyelectrolyte membrane 11 that selectively transports hydrogen ions, forming a catalytic layer (cathode-side catalytic layer) 13 composed mainly of carbon powder carrying thereon a platinum catalyst on the cathode side, and placing, on outer surfaces of those catalytic layers 12 and 13, gas diffusion layers 14 having both fuel-gas (fuel-fluid) or oxidizer-gas permeability and electron conductivity. For the polyelectrolyte membrane 11, a solid polymer material showing proton conductivity, for example, perfluorosulfonic acid membrane (e.g., Nafion membrane made by DuPont) is commonly used.

Each of the separators 11 and 41 needs only to be made of a gas-impermeable conductive material and, for example, such materials as a resin-impregnated carbon material cut into a specified configuration or moldings of a mixture of carbon powder and resin material are commonly used. Recessed groove portions are formed in surfaces of the separators 11 and 41, respectively, at which they contact the MEA 10. Contact of the groove portions with the gas diffusion layer 14 forms gas passage for feeding the fuel gas or the oxidizer gas to the electrode surfaces and for carrying away any excess gas.

Figure 3A:
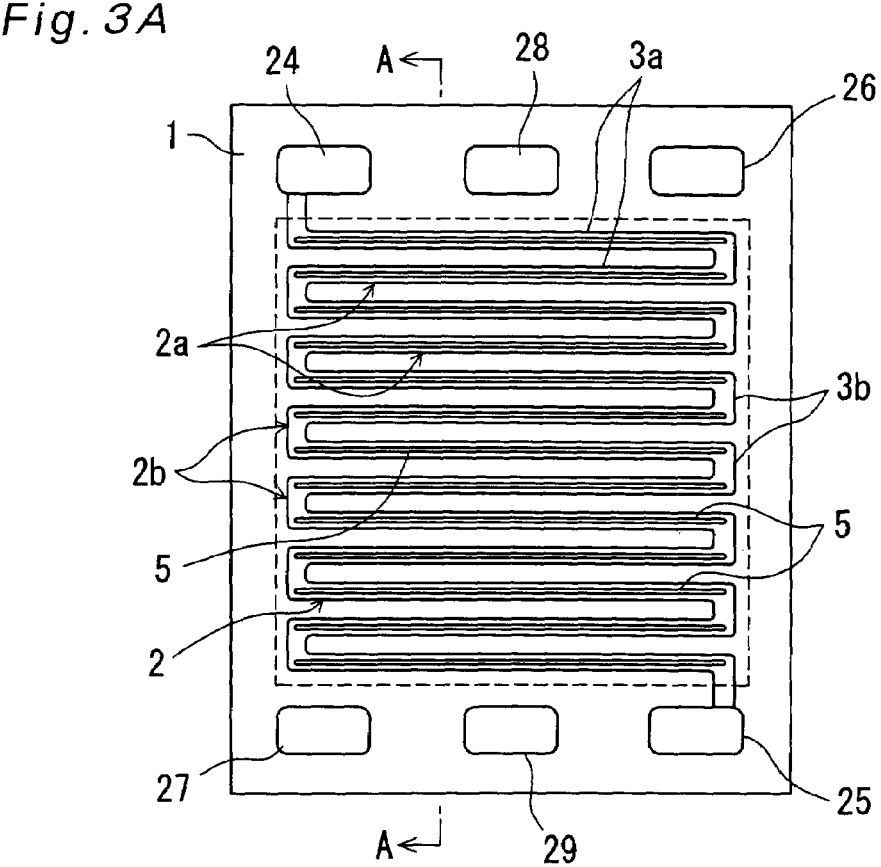
FIG. 3A is a sectional view of a unit cell forming the stack of FIG. 2 as viewed along arrows B-B.

Now a schematic sectional view showing the structure of the unit cell 20 included in such a stack 30 as shown above is shown in FIG. 3B, while a view taken along arrows B-B in FIG. 3B is shown in FIG. 3A. with reference to these figures, a detailed structure of the separator in which a groove portion forming the gas passage is formed is described below. In addition, FIG. 3B is also a schematic sectional view of the line A-A cross section in FIG. 3A, and FIG. 3A is a view showing only the anode-side separator 1 out of the anode-side separators 1 and the cathode-side separators 41 included in the unit cell 20 shown in FIG. 3B.

Figure 3B:
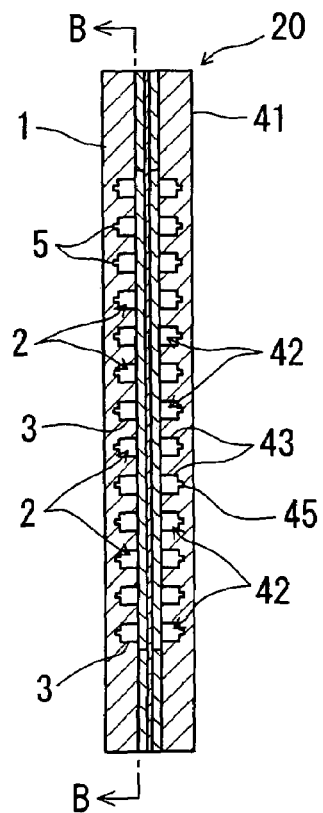
FIG. 3B is a sectional view of the unit cell of FIG. 3A taken along the line A-A.

As shown in FIGS. 3A and 3B, on the surface of the anode-side separator 1, for example, a recessed groove portion 3 for forming a gas passage 2 is formed from inlet toward outlet in such a serpentine shape as to be directionally changed to a plurality of times in left-and-right direction as viewed in the figures. This serpentine groove portion 3 is composed of a plurality of linear groove portions 3a placed generally linearly and parallel to one another along the left-and-right direction, and a plurality of bent groove portions (or coupling use groove portions) 3b for coupling end portions of adjacent linear groove portions 3a with one another so as to make the passages communicated with one another while inverting their flow direction in the left-and-right direction as in the figures. That is, the fuel gas passage 2 is formed, as a continued passage running from inlet to outlet, by a plurality of generally linear passage portions 2a composed of a plurality of parallelly placed linear groove portions 3a, and bent passage portions 2b composed of a plurality of bent groove portions 3b and bending and inverting the flow direction of adjacent linear passage portions 2a while making their end portions communicated with one another.

Also, in the anode-side separator 1, manifolds which are through holes for the supply and discharge of the fuel gas and the oxidizer gas to and from the unit cell 20 are formed at outer peripheral portions of the area over which the gas passage 2 is formed. More specifically, a fuel-gas inlet manifold 24, a fuel-gas outlet manifold 25, an oxidizer-gas inlet manifold 26, and an oxidizer-gas outlet manifold 27 are formed, and moreover a cooling-water inlet manifold 28 for passing cooling water for efficient removal of heat generated during power generation in the individual unit cells 20, as well as a cooling-water outlet manifold 29, are formed. In the fuel cell 101 in which a plurality of unit cells 20 are stacked, the fuel-gas inlet manifold 24, the fuel-gas outlet manifold 25, the oxidizer-gas inlet manifold 26, the oxidizer-gas outlet manifold 27, the cooling-water inlet manifold 28, and the cooling-water outlet manifold 29 are so positioned as to be communicated with their corresponding ones in their stacking direction through all the unit cells 20. It is noted that unshown seal members are set in the individual separators 1 and 41, the current collector plates 21, the insulating plates 22 and the end plates 23 so that the fuel gas and the oxidizer gas or the like can be prevented from being mixed together or leaked outside.

In the anode-side separator 1, a series of groove portions 3 composed of the linear groove portions 3a and the bent groove portions 3b, respectively, are formed so as to give a connection from the fuel-gas inlet manifold 24 to the fuel-gas outlet manifold 25, by which the continued gas passage 2 communicated with both manifolds 24, 25 is formed.

Figure 4:
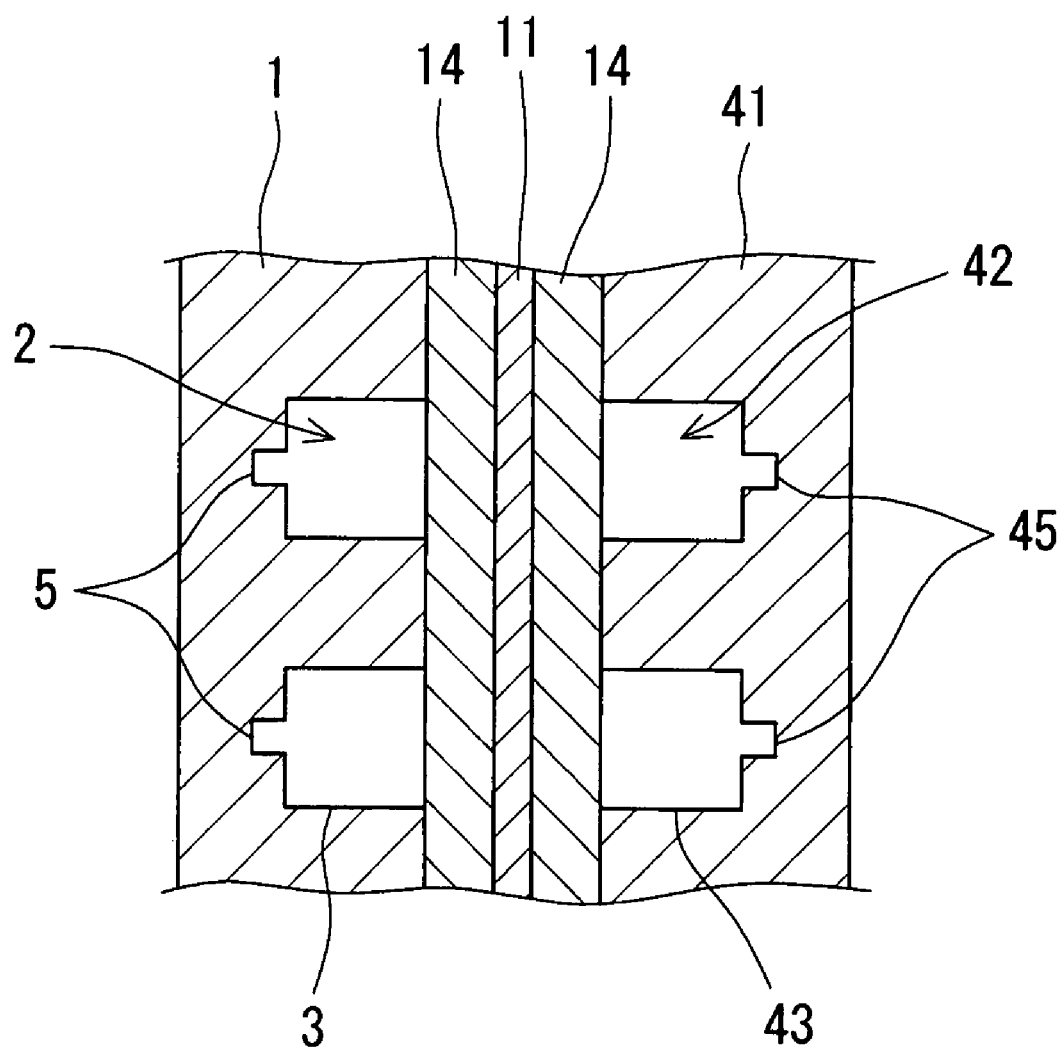
FIG. 4 is a partially enlarged schematic sectional view of the unit cell of FIG. 3B.

Now a schematic enlarged sectional view of the groove portion 3 formed in the surface of the separator 1 is shown in FIG. 4. As shown in FIG. 4, small groove portions (or narrow groove portions) 5, which are recessed groove portions smaller enough as compared with the groove portion 3, are formed in a bottom portion of the inner wall surface (inner circumferential surface) of the groove portion 3. These small groove portions 5 are formed, for example, each at a generally center of the bottom portion in such a generally linear shape as to extend in continuation from one end of each linear groove portion 3a to the other end as shown in FIG. 3A. The small groove portions 5 are formed only at the individual linear groove portions 3a, and not formed at the individual bent groove portions 3b. That is, in the gas passage 2, the small groove portions 5 are formed at the generally linear passage portions 2a so as to continue over the entirety from one end to the other end, and the individual small groove portions 5 are not communicated with one another but disconnected and discontinued at the individual bent passage portions 2b that make the individual linear passage portions 2a linear passage portions 2a communicated therebetween at their end portions.

These small groove portions 5 are capable of retaining water (produced water) within the small groove portions 5 when water contents (steam) contained in the fuel gas and the like are condensed into water drops due to temperature changes of the separators 1 or the like during the power generation in the fuel cell 101. That is, since the small groove portions 5 are not continued (communicated) up to the fuel-gas outlet manifold 25 but disconnected and discontinued at the individual bent passage portions 2b, the water that has entered into the small groove portions 5 can be retained in the small groove portions 5 without being thrust toward the outlet by the fuel gas flow and discharged in all. In terms of such a water retaining function of the small groove portions 5, the small groove portions 5 can be said to be an example of a water-retaining groove portion or a water retaining portion. In the case of the stack 30 of this embodiment, while water is retained in the small groove portions 5 by using the small groove portions 5 having such a water retaining function, water drops generated in the passage 2 can be brought into contact with the water retained in the small groove portions 5 so that the surrounding inner wall surface including the small groove portions 5 can be brought into a hydrophilicity-imparted state. As a consequence, the water drops are suppressed to grow such largeness as to block the gas passage 2.

Figure 5A:
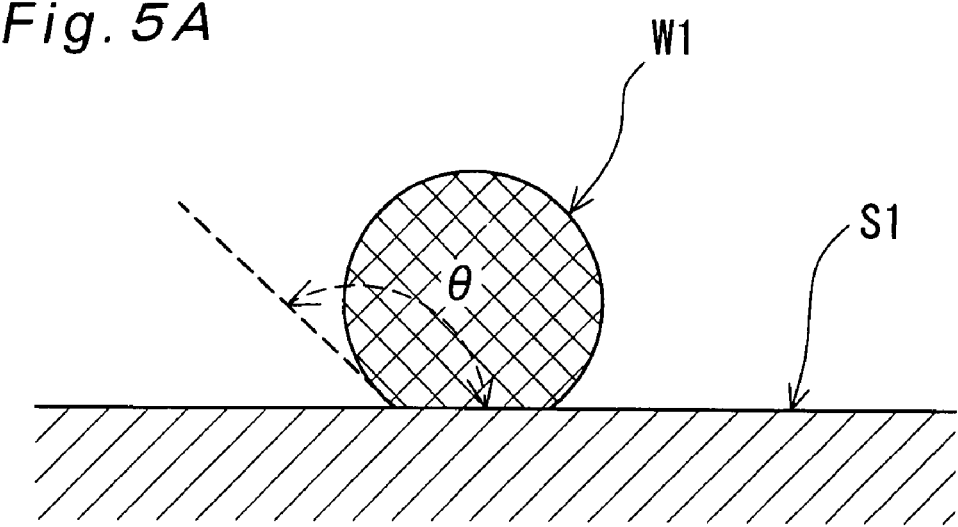
FIG. 5A is a schematic explanatory view for explaining a state of water repellency.
Figure 5B:
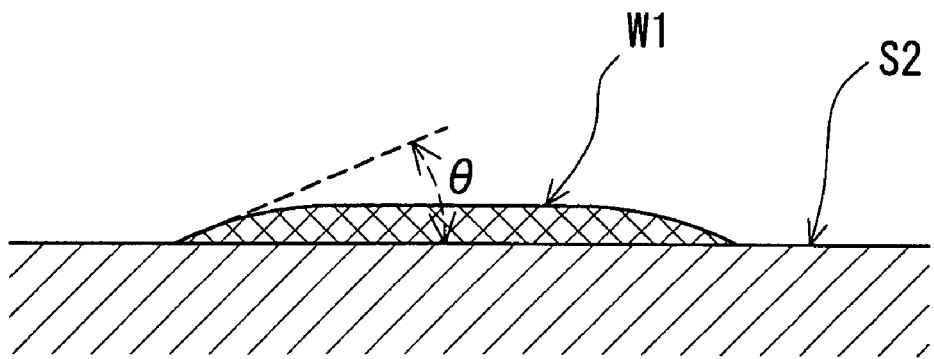
FIG. 5B is a schematic explanatory view for explaining a state of hydrophilicity.

Here is explained the principle for suppressing blockage of the gas passage 2 by the small groove portions 5 imparting hydrophilicity to vicinities of the small groove portions 5 with reference to the drawings. For this explanation, the meanings of the terms of hydrophilicity and water repellency are first explained. In a case where a member surface S1 has water repellency as shown in FIG. 5A, a water drop W1 attaching to the member surface S1 maintains nearly spherical-shaped. In this case, an angle at which the water drop W1 makes contact with the member surface S is commonly referred to as a contact angle θ, where the more the contact angle θ limitlessly approaches 180 degrees, the higher water repellency the member surface S1 has (i.e., a state of super-water-repellency). In contrast to this, in a case where a member surface S2 has hydrophilicity as shown in FIG. 5B, a water drop W2 attaching to the member surface S2 keeps so shaped as to be stretched along the surface S2. In such a state, the contact angle θ becomes 40° or lower as an example, where the more the angle limitlessly approaches 0°, the higher hydrophilicity the member surface S2 (i.e., a state of super-water-repellency). Generally, a state that the contact angle θ is 40° or lower is called hydrophilic. In a comparison between the shape of the water drop W1 attaching in a water-repellent state of FIG. 5A and the shape of the water drop W2 attaching in a hydrophilic state of FIG. 5B, the water drop W1 in the water-repellent state is larger in height so that the contact portion with the member surface S1 becomes the least possible, while the water drop W2 in the hydrophilic state is lower in height so that its contact portion with the member surface S2 becomes larger.

Figure 6A:
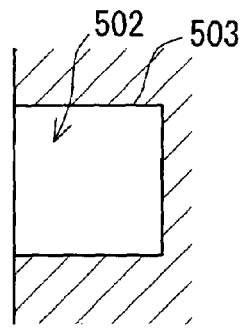
FIG. 6A is a schematic explanatory view for explaining the growth of a water drop in a gas passage having no small groove portion according to a comparative example of the embodiment, showing a state in which no water drop has been generated in the gas passage.
Figure 6B:
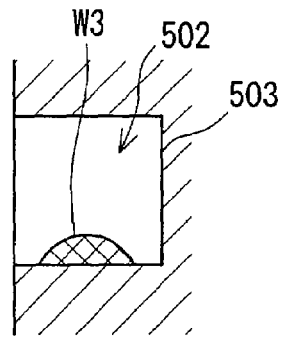
FIG. 6B is a schematic explanatory view for explaining the growth of a water drop in succession to FIG. 6A, showing a state in which a water drop has been generated in the gas passage.
Figure 6C:
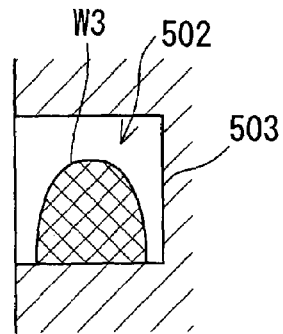
FIG. 6C is a schematic explanatory view for explaining the growth of a water drop in succession to FIG. 6B, showing a state in which the water drop has been largely grown.
Figure 6D:
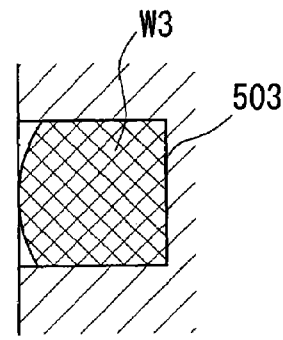
FIG. 6D is a schematic explanatory view for explaining the growth of a water drop in succession to FIG. 6C, showing a state in which the grown water drop has blocked the gas passage.
Figure 6E:
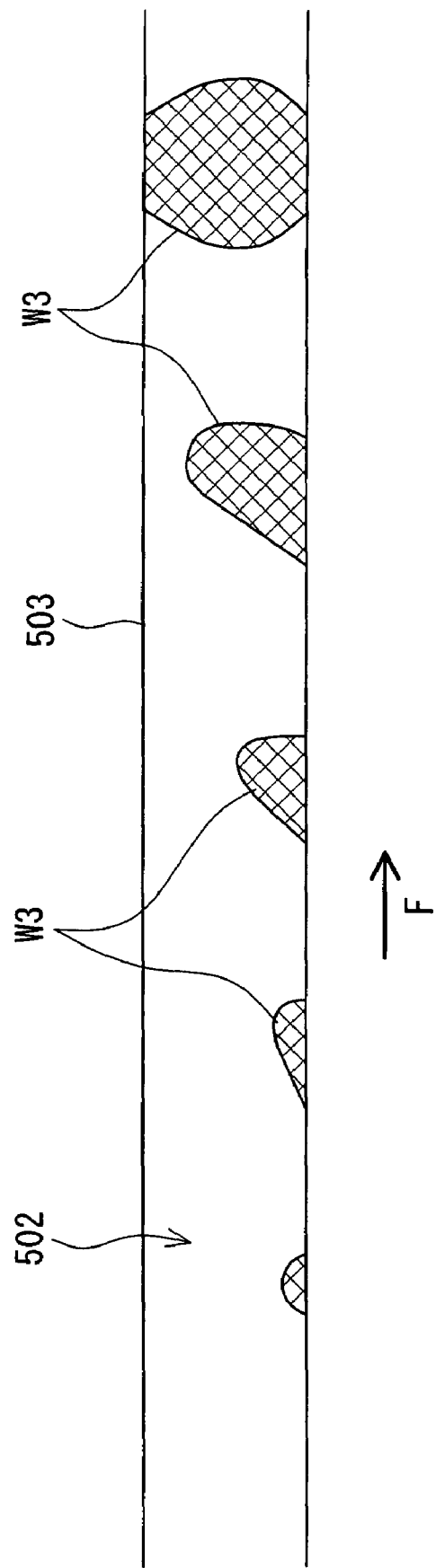
FIG. 6E is a schematic explanatory view showing the growth process of a water drop of FIGS. 6A to 6D along the moving path of the water drop along the flow direction of the gas passage.

Since the separator 1 is formed from a carbon material as described above, the inner wall surfaces of its groove portions 3 have water repellency. Therefore, for example, assuming a case in which a gas passage 502 is composed of groove portions 503 having no small groove portions 5 formed therein in a conventional separator 1 as shown in the schematic explanatory view of FIG. 6A, a small water drop W3 generated within the gas passage 502 in FIG. 6B attaches to the inner wall surface (a lower wall surface in the figure) having water repellency within the groove portion 503 in such a swollen state that its contact area becomes smaller. The water drop W3 grows along with the progress of condensation while being pushed forward on flow by the fuel gas flow as shown in a gas passage plan view of FIG. 6E. As a result, as shown in FIGS. 6C and 6D, the water drop W3 is grown up to such a size as to block the gas passage 502, so that the gas passage 502 is finally blocked by the water drop W3.

Figure 7A:
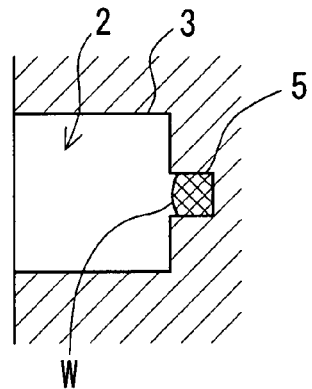
FIG. 7A is a schematic explanatory view for explaining the growth of a water drop in the gas passage having a small groove portion in the embodiment, showing a state in which water is retained in the small groove portion in the gas passage and moreover no water drop has been generated.
Figure 7B:
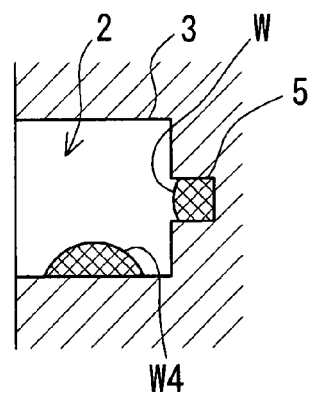
FIG. 7B is a schematic explanatory view for explaining the growth of a water drop in succession to FIG. 7A, showing a state in which the water drop has been generated in the gas passage.
Figure 7C:
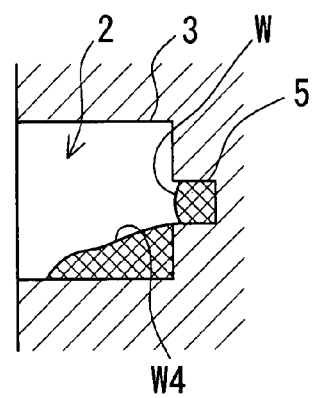
FIG. 7C is a schematic explanatory view for explaining the growth of a water drop in succession to FIG. 7B, showing a state in which the water drop has been largely grown.
Figure 7D:
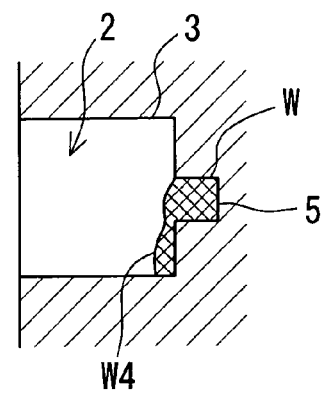
FIG. 7D is a schematic explanatory view for explaining the growth of a water drop in succession to FIG. 7C, showing a state in which the grown water drop, being in contact with the water retained in the small groove portion, is brought into a hydrophilic state with its growth suppressed.
Figure 7E:
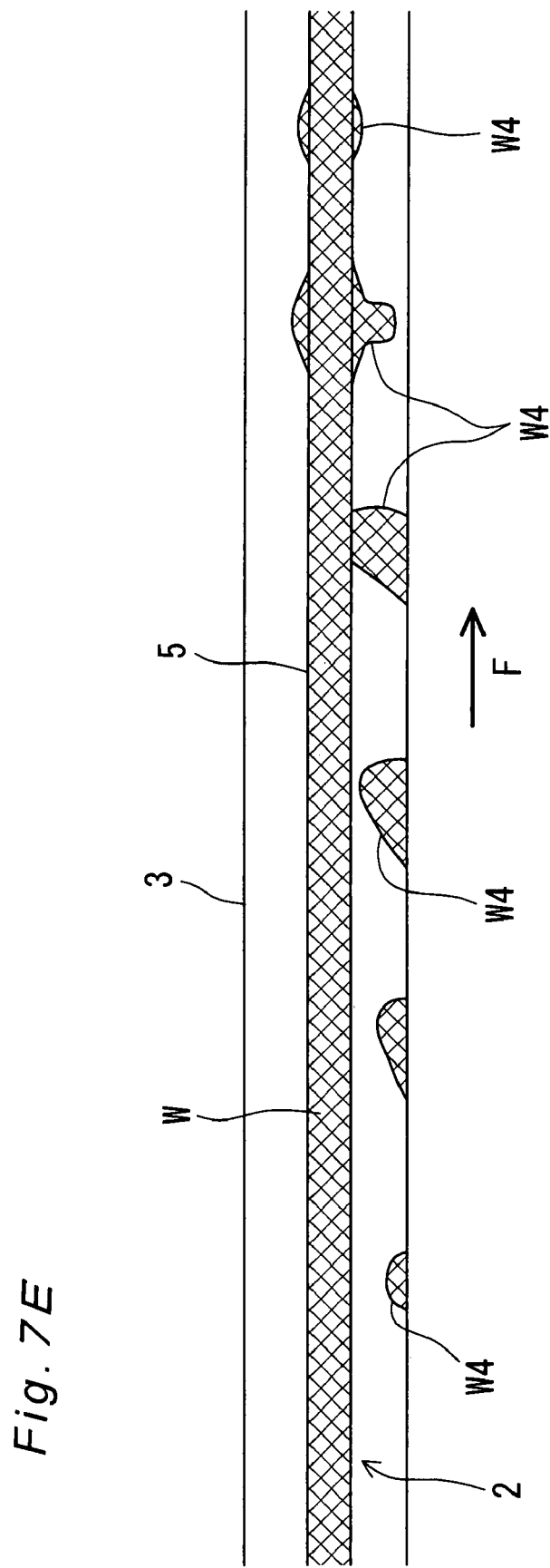
FIG. 7E is a schematic explanatory view showing the growth and growth-suppression process of a water drop in FIGS. 7A to 7D along the moving path of the water drop in the flow direction of the gas passage.

In contrast to this, as in the separator 1 of this embodiment, in which the small groove portions 5 are formed within the groove portions 3 and in which the small groove portions 5 have a water retaining function for retaining water inside thereof, if a water drop W4 is generated, for example, at a position spaced from the small groove portion 5 in the gas passage 2 as shown in FIG. 7B while the water W is retained in the small groove portion 5 as shown in FIG. 7A, then the water drop W4, while being pushed on flow by the fuel gas flow, is gradually grown to become larger along with the progress of condensation as shown in FIG. 7E (see FIGS. 7B and 7C). Afterwards, when the water drop W4 is grown enough to make contact with the water W retained in the small groove portion 5 so as to be in contact with the water W, the water forming the water drop W expands along the surface of the retained water W, giving rise to a phenomenon equivalent to an occurrence that hydrophilicity is imparted to the surface of the water W and to around and near the small groove portion 5. As a result, the growth of the water drop W4 is suppressed and moreover changed in shape so as to stretch along the inner wall surface, so that the blockage of the gas passage 2 is suppressed. That is, the small groove portion 5 having the water retaining function has a role of putting the retained water into contact with the water drop generated within the gas passage 2 to thereby impart hydrophilicity to part of the inner wall surface of the groove portions 3 forming the gas passage 2 (i.e., surface of the water retained in the small groove portions 5 as well as its vicinities). It is noted that in FIGS. 6E and 7E, the arrow F indicates the gas flow direction in the gas passage.

Thus, in the gas passage 2 that has not been subjected to hydrophilic treatment, a water drop that has grown to a certain level of size is transformed into a hydrophilic state so as not to grow any more, by which blockage of the gas passage 2 can be prevented. Further, the water (water drop) that has been transformed into a hydrophilic state as shown above is pushed on flow along the small groove portions 5 and the inner wall surfaces of their peripheries and vicinities according to the fuel gas flow, thus being discharged through the fuel-gas outlet manifold 25.

Such small groove portions are formed not only in the anode-side separator 1 but also in the cathode-side separator 41. More specifically, as shown in FIGS. 3A, 3B and 4, in the cathode-side separator 41, a continued oxidizer gas passage 42 is formed from the oxidizer-gas inlet manifold 26 to the oxidizer-gas outlet manifold 27, and the oxidizer gas passage 42 is made up by combining linear passage portions 42a and bent passage portions 42b. Further, groove portions 43 constituting the oxidizer gas passage 42 is composed of linear groove portions 43a and bent groove portions 43b, and a small groove portion 45 is formed at a bottom center of the inner wall surface of each linear groove portion 43a. This small groove portion 45 is formed continuously from one end to the other end of the linear groove portions 43a, and not formed at the bent groove portions 43b. Thus, also in the cathode-side separator 41, the small groove portions 45 are formed within the oxidizer gas passage 42, so that a water drop generated within the oxidizer gas passage 42 due to condensation of moisture contained in the oxidizer gas or the like can be brought into contact with the water retained in the small groove portions 45, by which growth of the water drop can be suppressed before the drop grows to enough size to block the gas passage 42. Thus, occurrence of passage blockage can be prevented.

Such small groove portions 5, 45 as shown above are, preferably, formed in such size and shape that water in contact with part of the small groove portions 5, 45 is sucked-and-attracted and retained inside, for example, by using a capillary phenomenon and further the water once having been trapped will not vaporize even by gas passage but can be retained therein. As an example, it is preferable that the small groove portion 5, 45 is formed so as to have a width w of 0.2 mm and a depth d of 0.2 mm while the groove portion 3, 43 has a width W of 1 mm and a depth D of 1 mm. In particular, the width w of the small groove portion 5, 45 is desirably set to a half or less of the width W of the groove portion 3, 43 and, more preferably, to a length within a range of ½ to ¹/₁₀ of the width W. Although such small groove portions 5, 45 may be formed at any positions in the inner wall surfaces of the groove portions 3, 43, yet the small groove portions 5, 45 are preferably formed, for example, in vicinities of bottom centers of the groove portions 3, 43 as shown in FIG. 4 in order to suppress the growth of water drops to sizes larger than about one half of the cross sections of the gas passages 2, 42.

Figure 8A:
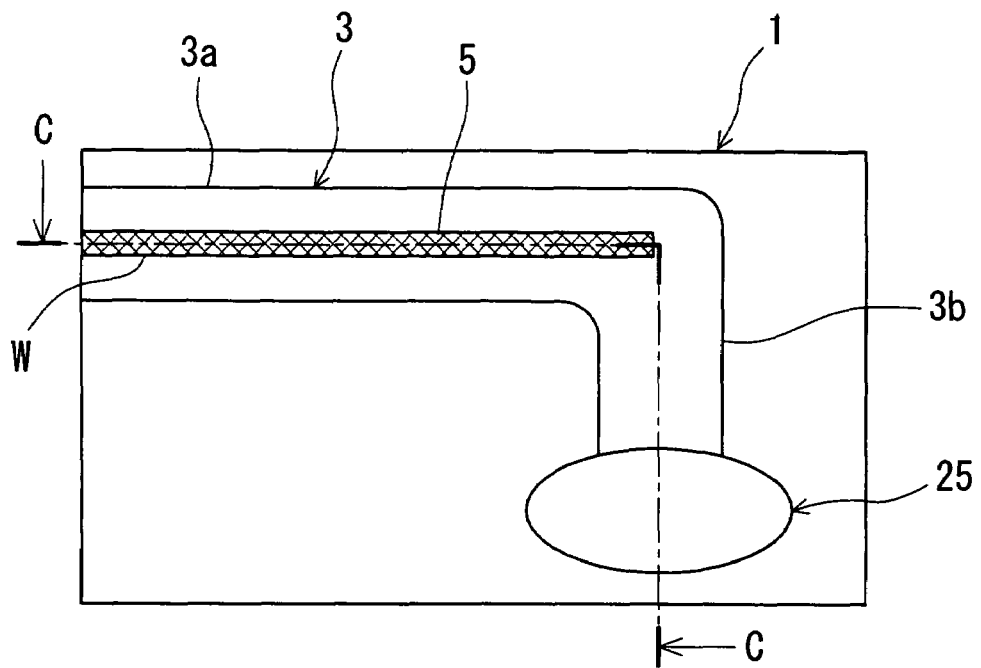
FIG. 8A is a partially enlarged schematic plan view of a proximity to a fuel-gas outlet manifold in the separator of the embodiment.
Figure 8B:
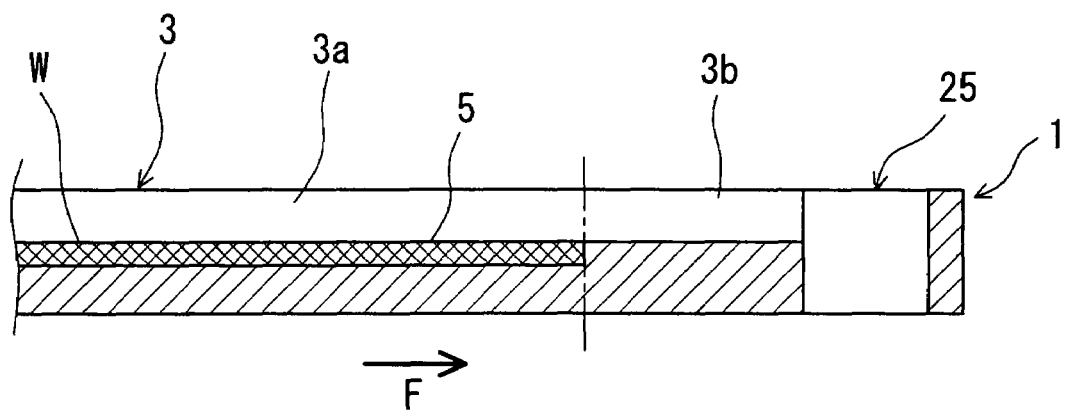
FIG. 8B is a schematic sectional view of the separator of FIG. 8A taken along the line C-C.

Also, as shown in FIG. 8A, which is a partially enlarged schematic plan view of a groove portion 3 in proximity to the fuel-gas outlet manifold 25 in the separator 1, and in FIG. 8B, which is a schematic sectional view of the groove portion 3 shown in the plan view and taken along the line C-C, it is preferable that the small groove portion 5 formed continuous up to an end portion of the linear groove portion 3a is formed so as not to be communicated with the manifold 25 at the bent groove portion 3b. As to the reason of this, by an arrangement that at least the terminal end of the small groove portion 5 is not communicated with the outlet manifold 25 (i.e., being discontinuous), water that has entered into the small groove portion 5 can be inhibited from aggressively flowing to the manifold 25 and being discharged, so that the water retaining function of the small groove portion 5 can be ensured.

Figure 9A:
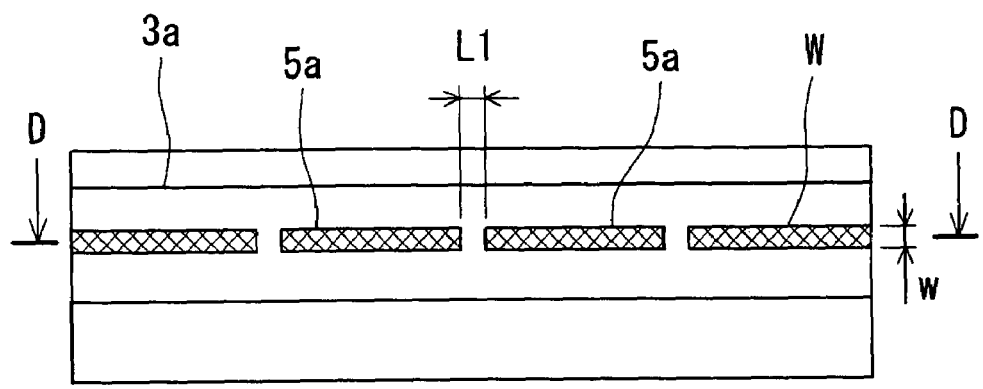
FIG. 9A is a schematic plan view showing a state in which a plurality of small groove portions are substantially continuing in the gas passage of the embodiment.
Figure 9B:
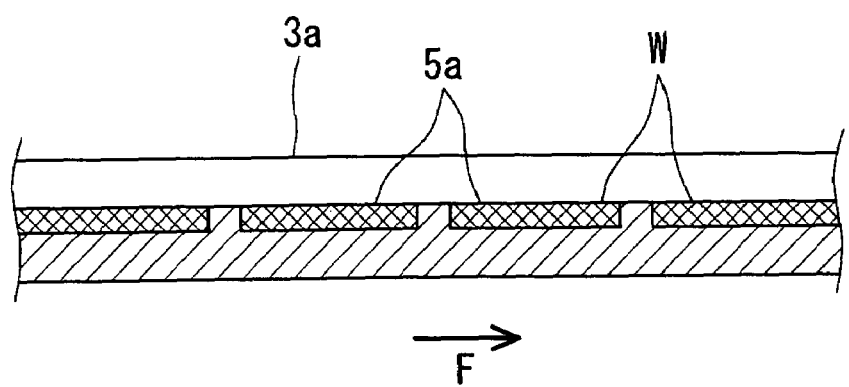
FIG. 9B is a schematic sectional view of the gas passage of FIG. 9A taken along the line D-D.

Besides, as described above, it is preferable for this embodiment that the small groove portions 5, 45 are formed so as to continue from one end to the other end of the linear groove portions 3a, 43a constituting the gas passages 2, 42, respectively. It is noted that the wording, being continuous from one end to the other end, may include states similar to a state of being substantially continuous even if discontinuous places are partly included. For example, as shown in FIG. 9A, which is a partially enlarged schematic plan view of the linear groove portion 3a, and in FIG. 9B, which is a sectional view taken along the line D-D of the figure, even in cases where a plurality of disconnected small groove portions 5a are formed, growth of a water drop exceeding the width w of the small groove portion 5 can be suppressed as far as an interval L1 between adjacent small groove portions 5a is not more than the width w of each small groove portion 5 as an example. Accordingly, for the present invention, a state of disconnection with such an interval L1 can be regarded as a state that the small groove portions 5a are substantially continuous.

Figure 10A:
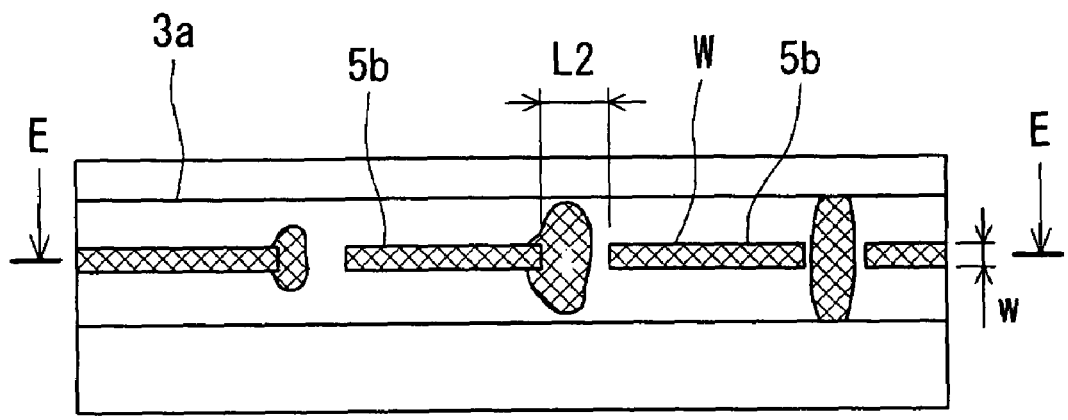
FIG. 10A is a schematic plan view showing a state in which a plurality of small groove portions are not substantially continuing in the gas passage.
Figure 10B:
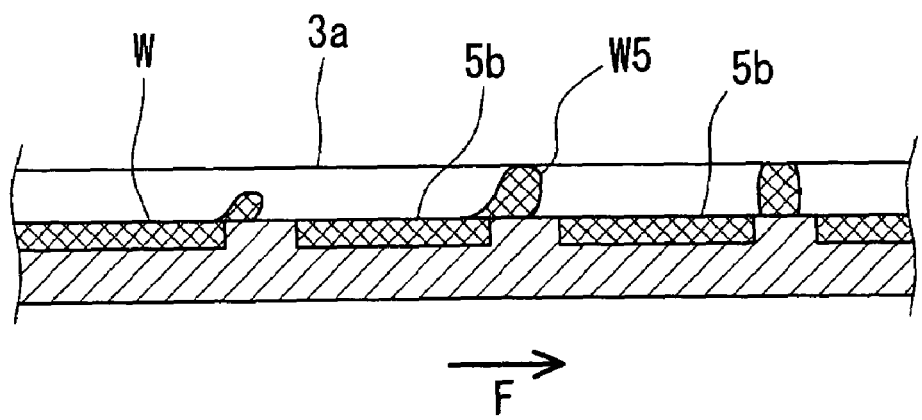
FIG. 10B is a schematic sectional view of the gas passage of FIG. 10A taken along the line E-E.

In contrast to this, like the linear groove portion 3a shown as a comparative example of this embodiment in a partial schematic plan view of FIG. 10A and an E-E line sectional view of FIG. 10B, where the small groove portions 5b are formed, for example, at an internal L2 larger than the width w of each small groove portion 5b, the small groove portions 5b cannot be regarded as being in a substantially continuous state, but is in a discontinuous state. In such a discontinuous state, even when a water drop W5 generated between adjacent small groove portions 5b has grown larger than the width w of each small groove portion 5b, it can well occur that the water drop W5 does not make contact with the water retained in the small groove portions 5b, in which case it cannot be said that the passage blockage is suppressed enough.

In addition, in each of the separators 1 (or separators 41) of the stack 30 in this embodiment described above, the gas passage 2 is so made up that the small groove portion 5 is formed in each of the linear passage portions 2a, while the small groove portion is not formed in each of the bent passage portions 2*b*. This is because the bent passage portion 2*b* is a relatively short passage portion, and such a separator in many cases has its gas-passage formation surface positioned along the vertical direction and further its individual linear passage portions 2*a* positioned along a direction perpendicular to the vertical direction, so that liquid drops are comparatively unlikely to be accumulated due to the action of gravity or the like at the bent passage portions. Instead of such cases, the small groove portions may also be formed at the bent passage portions 2*b*, respectively, but discontinuous places need to be provided so that the formed small groove portions are not communicated with the outlet manifold 25.

Now, various placement modes of the small groove portions are described as modification examples of this embodiment with reference to the accompanying drawings.

Figure 14A:
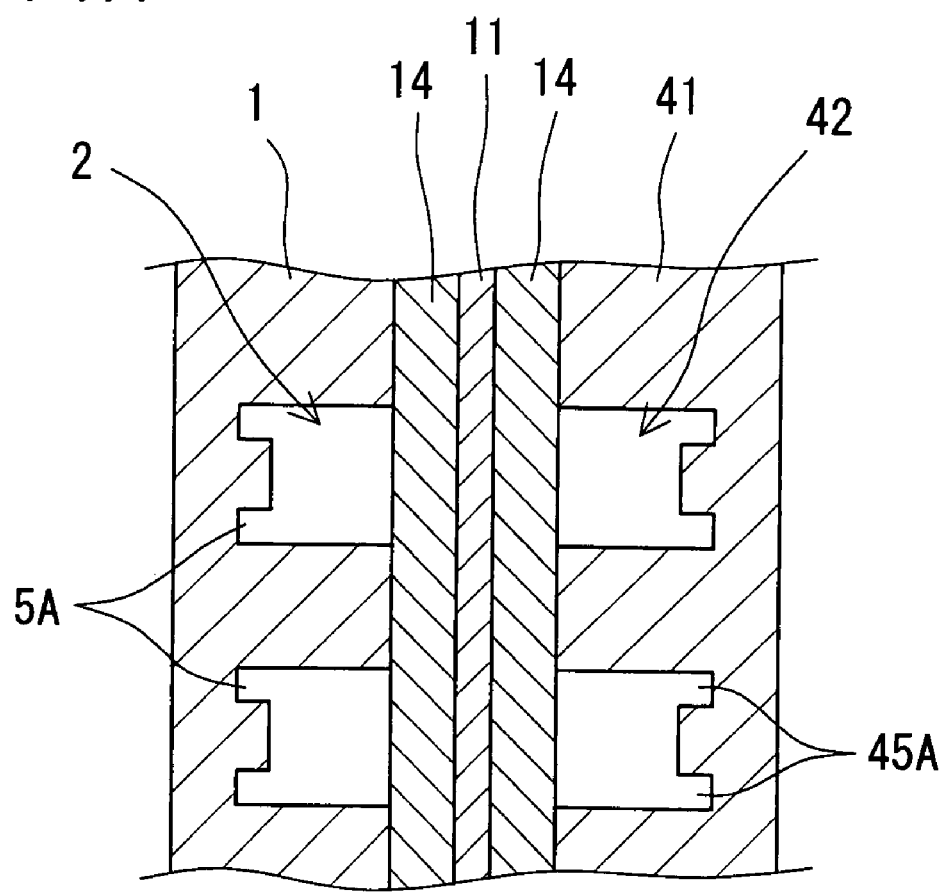
FIG. 14A is a partially enlarged schematic sectional view of a unit cell according to a modification of the embodiment, showing a gas passage having two small groove portions formed therein.
Figure 14B:
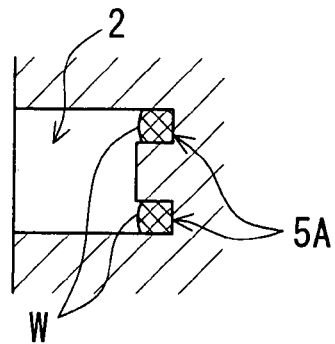
FIG. 14B is a schematic explanatory view of a process that the growth of water drops is suppressed in the gas passage of FIG. 14A, showing a state in which water is retained in the two small groove portions.
Figure 14C:
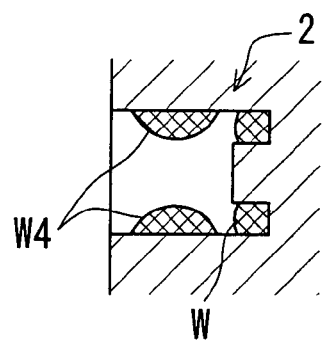
FIG. 14C is a schematic explanatory view of a water drop-growth suppression process in succession to FIG. 14B, showing a state in which water drops have been generated in the gas passage.
Figure 14D:
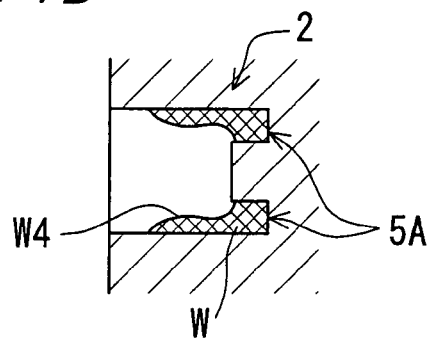
FIG. 14D is a schematic explanatory view of a water drop-growth suppression process in succession to FIG. 14C, showing a state in which the water drops are in contact with water retained in the two small groove portions.
Figure 14E:
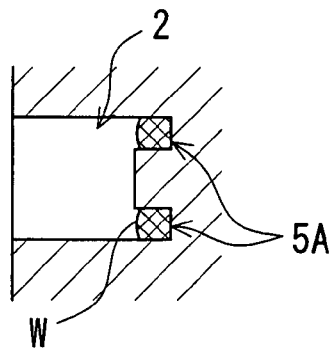
FIG. 14E is a schematic explanatory view of a water drop-growth suppression process in succession to FIG. 14D, showing a state in which the water drops have been brought into a hydrophilic state.

First, as shown in FIG. 14A, which is a schematic sectional view of the unit cell 20, two small groove portions 5A may be formed in the gas passage 2 so as to be placed parallel to each other as an example. Such small groove portions 5A may be formed, for example, at corner portions of a bottom portion of the gas passage 2. In the gas passage 2 having the small groove portions 5A formed like this, as shown in the schematic explanatory views of FIGS. 14B, 14C, 14D and 14E, water W can be retained at two places within the gas passage 2, so that water drops W4 generated in the gas passage 2 can be brought into contact with the water W retained in the small groove portions 5A in earlier stages, making it possible to earlier suppress the growth of water drops. In addition, two small groove portions 45A may be formed also in the cathode-side separator 41.

Figure 15A:
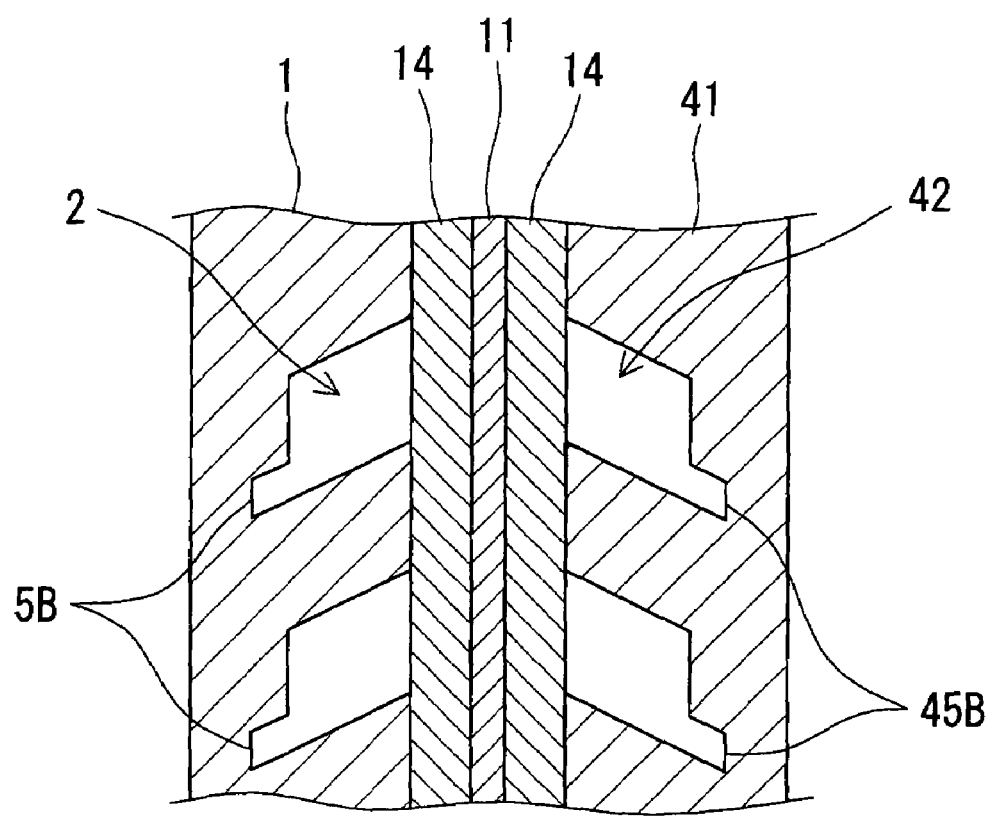
FIG. 15A is a partially enlarged schematic sectional view of a unit cell according to a modification of the embodiment, showing small groove portions having an inclined-shaped cross section and a gas passage.
Figure 15B:
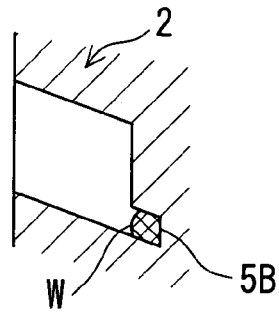
FIG. 15B is a schematic explanatory view of a water drop-growth suppression process in the gas passage of FIG. 15A, showing a state in which water is retained in the small groove portion.
Figure 15C:
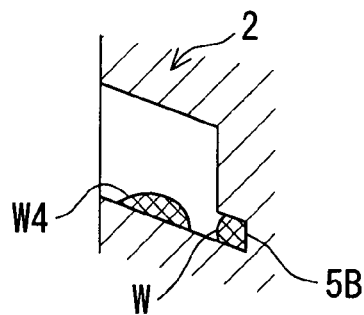
FIG. 15C is a schematic explanatory view of a water drop-growth suppression process in succession to FIG. 15B, showing a state in which a water drop has been generated in the gas passage.
Figure 15D:
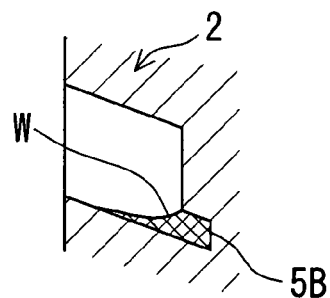
FIG. 15D is a schematic explanatory view of a water drop-growth suppression process in succession to FIG. 15C, showing a state in which the water drop is in contact with the water retained in the small groove portion.
Figure 15E:
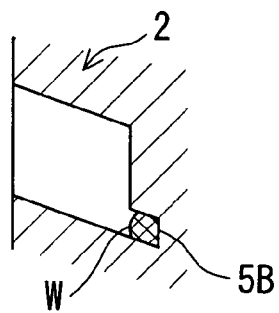
FIG. 15E is a schematic explanatory view of a water drop-growth suppression process in succession to FIG. 15D, showing a state in which the water drop has been brought into a hydrophilic state.

Also, as shown in FIG. 15A, which is a schematic sectional view of the unit cell 20, the gas passage 2 itself may be formed in the separator 1 so as to be inclined with respect to the surface of the separator 1. In such a case, it is preferable that, for example, the surface of the separator 1 is positioned along the vertical direction and moreover the inclination direction of the gas passage 2 is so determined that the bottom side of the gas passage 2 is located on the lower side in the vertical direction, and moreover a small groove portion 5B is formed at a position that is the lowermost in the inclination direction within the gas passage 2. With such an arrangement, as shown in the schematic explanatory views of FIGS. 15B, 15C, 15D and 15E, a water drop W4 generated within the gas passage 2 can be led so as to approach the small groove portion 5B by the action of gravity, so that the growth of water drops can be suppressed in earlier stages. Further, since the water W can be accumulated more easily in a lower inner circumferential surface of the gas passage 2 as in the figure, the lower inner circumferential surface can be held in a hydrophilic state over a prolonged period. In addition, such small groove portions 45B may be formed also in the cathode-side separator 41.

Figure 16A:
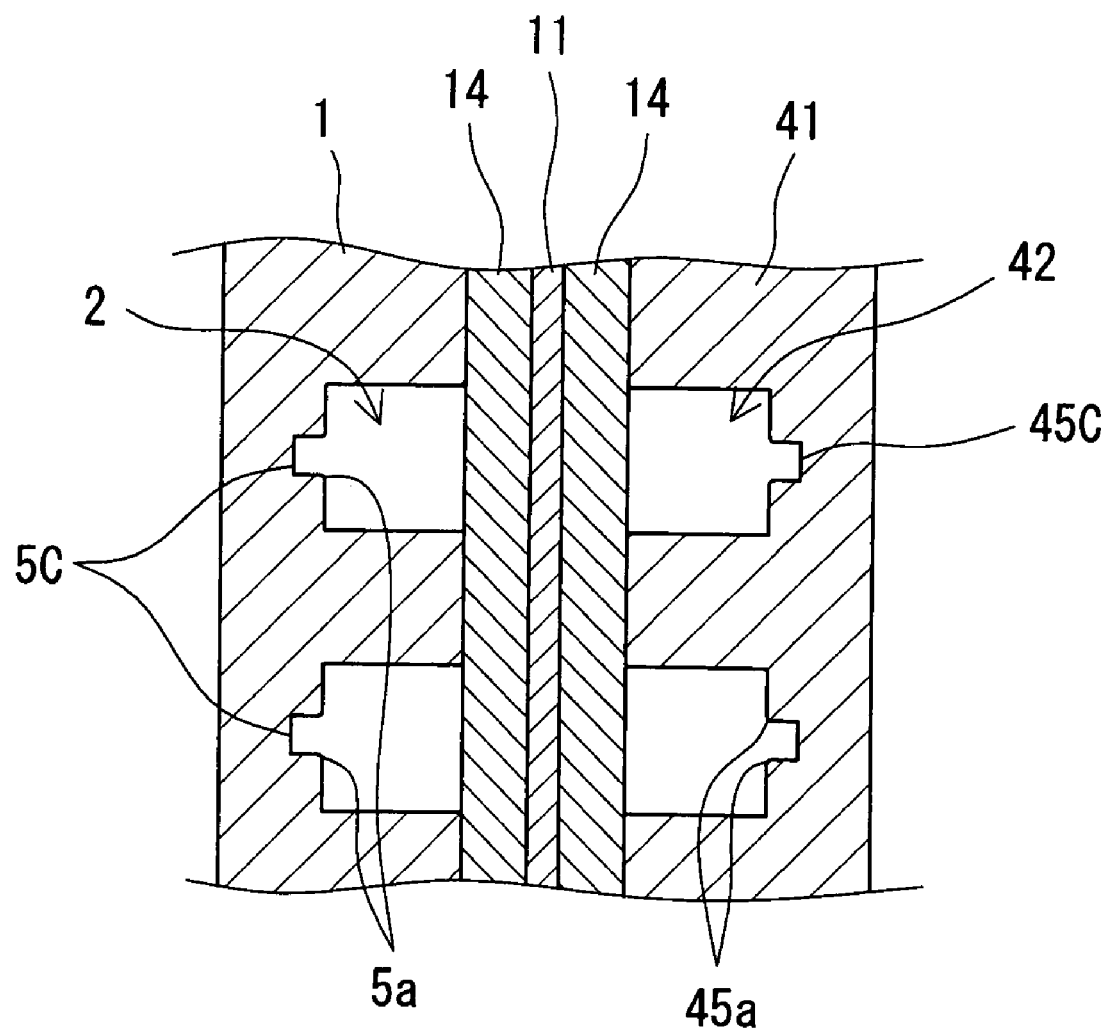
FIG. 16A is a partially enlarged schematic sectional view of a unit cell according to a modification of the embodiment, showing a gas passage in which small groove portions having curved surface portion at its corner portions are formed.
Figure 16B:
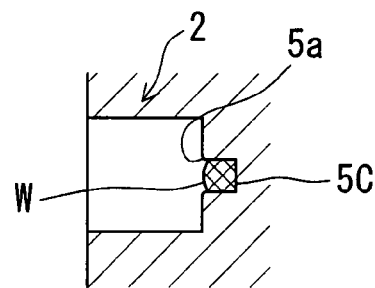
FIG. 16B is a schematic explanatory view of a water drop-growth suppression process in the gas passage of FIG. 16A, showing a state in which water is retained in the small groove portion.
Figure 16C:
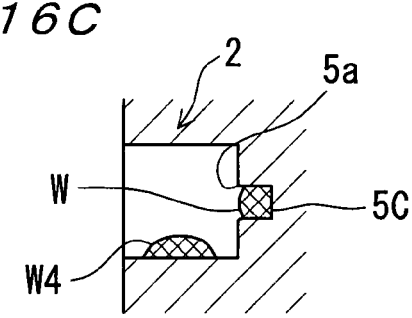
FIG. 16C is a schematic explanatory view of a water drop-growth suppression process in succession to FIG. 16B, showing a state in which a water drop has been generated in the gas passage.
Figure 16D:
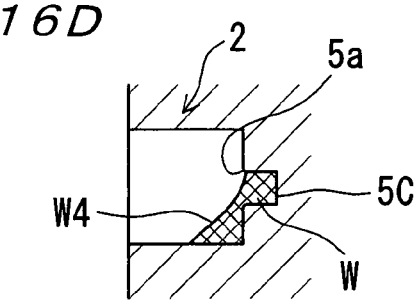
FIG. 16D is a schematic explanatory view of a water drop-growth suppression process in succession to FIG. 16C, showing a state in which the water drop is in contact with the water retained in the small groove portion.
Figure 16E:
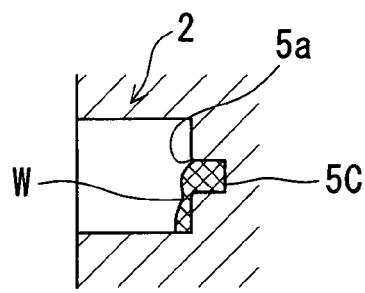
FIG. 16E is a schematic explanatory view of a water drop-growth suppression process in succession to FIG. 16D, showing a state in which the water drop has been brought into a hydrophilic state.

Further, as in small groove portions 5C formed in the unit cell 20 shown in FIG. 16A, curved-surface portions (R portions) 5*a* may be formed at inlet-side corner portions of the small groove portions 5C. By the formation of such curved-surface portions 5*a*, water generated in the gas passage 2 can be led to within the small groove portions 5C more easily as shown in the schematic explanatory views of FIGS. 16B, 16C, 16D and 16E, hence effective from the viewpoints of water retainability and the suppression of water drop growth. In addition, small groove portions 45C having such curved-surface portions 45*a* formed therein may be formed also in the cathode-side separator 41.

Figure 17A:
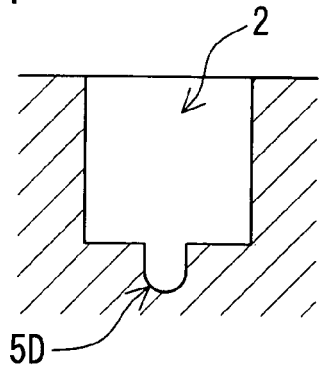
FIG. 17A is a schematic sectional view of a gas passage showing a form of a small groove portion according to a modification of the embodiment, showing a small groove portion having an inner wall surface formed into a curved surface.
Figure 17B:
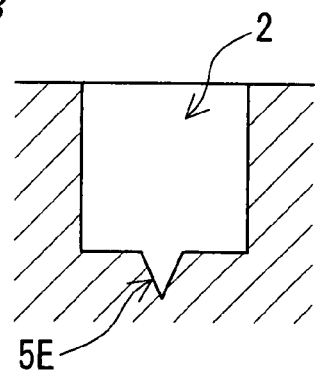
FIG. 17B is a schematic sectional view of a gas passage showing a form of a small groove portion according to a modification of the embodiment, showing a small groove portion having a V-shaped cross section.
Figure 17C:
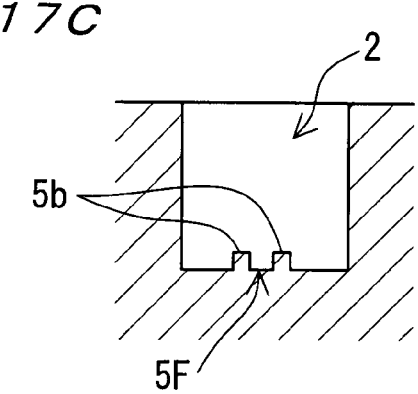
FIG. 17C is a schematic sectional view of a gas passage showing a form of a small groove portion according to a modification of the embodiment, showing a small groove portion which is elevated at a bottom portion of the gas passage.
Figure 17D:
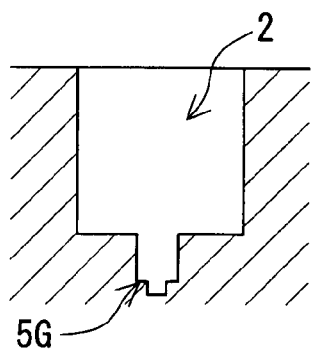
FIG. 17D is a schematic sectional view of a gas passage showing a form of a small groove portion according to a modification of the embodiment, showing a small groove portion having a two-stage structure.

Further, other modification examples are shown in the schematic sectional views of the gas passage 2 shown in FIGS. 17A, 17B, 17C and 17D. Adoptable alternative forms include a small groove portion 5D whose inner bottom face is formed into a curved surface as shown in FIG. 17A, a small groove portion 5E having a roughly V-shaped cross section as shown in FIG. 17B, and a small groove portion 5G having a two-stage structure as shown in FIG. 17D. Besides, as shown in FIG. 17C, a small groove portion 5F may be formed so as to be surrounded by two protruding raised portions 5*b* in the bottom portion of the gas passage 2. Even with such a form as in this case, a recessed cross section can be given and the function of retaining water inside can be provided, so that the small groove portion 5F in such a form is included in examples of the water-retaining groove portions of the present invention.

Further, in the individual linear passage portions 2*a*, without limitation to such a case where the small groove portions 5 are formed linearly along the passage direction of the linear passage portions 2*a*, the small groove portions may also be formed so as to, for example, meander. Even in such a case, the function of retaining water contents generated in the passage 2 can be provided, so that the water-drop-growth suppression effect can be achieved. However, even in the case where small groove portions are formed in such a meander shape, the groove portions need to be formed so as to extend substantially continuously from one end to the other end of the linear passage portions 2*a*.

Also, in the separators 1 and 41, the gas passages 2, 42 and the small groove portions 5, 45 can be formed by molding process. Therefore, in the inner wall surface of the gas passages 2, 42, positions where the small groove portions 5, 45 are formed are preferably determined in consideration of such molding process. For example, the small groove portions 5, 45 are preferably placed in bottom faces of the gas passages 2, 42 from the viewpoint of workability for the molding process. In addition, in a case where the small groove portions 5, 45 are formed in side faces of the inner wall surfaces of the gas passages 2, 42, the small groove portions may be formed by using cutting work or other means.

According to the above embodiment, in each of the unit cells 20 constituting the stack 30 of the fuel cell 101, small groove portions 5 enough smaller than the groove portions 3 for the formation of the gas passages 2 formed on the surface of the separator 1 (separator 41 as well) are formed in the inner wall surfaces of the groove portions 3, and moreover these small groove portions 5 are so formed as to make the individual linear groove portions 3*a* continued over the range from one end to the other end and non-continued at the individual bent groove portions 3*b* with a discontinuity to the outlet manifold 25. As a result, water generated within the gas passages 2 can be retained in the small groove portions 5. Thus, by virtue of the water retaining function that the individual small groove portions 5 have as shown above, a state that water is retained by the small groove portions 5 continuously over the entirety of the individual linear passage portions 2*a* of the gas passage 2 can be implemented, and thereafter, generated water drops get into contact with the water retained in the small groove portions 5 during their growth process, by which the growth of water drops can be suppressed. Accordingly, water drops can be inhibited from growing such sizes as to block the gas passages 2 or the like, so that the gas flow is stabilized and, as a result, the power generation state is stabilized, hence a better flooding-resistant property.

In a conventional, some fuel cells have such a construction that by using a separator which is so constructed that narrow communicating grooves communicating up to the outlet manifold are formed within such a gas passage as shown above, water generated within the gas passage is aggressively discharged through the communicating grooves to the outlet manifold. However, with this construction, since the communicating grooves are communicated with the outlet manifold, water within the grooves cannot be retained at all times, making it possible that water is present or absent in the grooves. Even if the principle of the present invention is applied to the prior-art separator having such a construction as shown above, it is true that given the presence of water, the water-drop growth can be suppressed by bringing the passage into a hydrophilic state, but given the absence of water, the passage is not brought into a hydrophilic state so that the water-drop growth cannot be suppressed. As a result, there are a hydrophilic state and a non-hydrophilic state compositely in the gas passages, so that the blockage of the passages could occur at the non-hydrophilic portions.

In contrast to this, the small groove portions 5 of this embodiment fulfill the water retaining function while being formed so as not to be communicated with the outlet manifold 25, in which case there is no such composite presence of the hydrophilic state and the non-hydrophilic state to a considerable extent. Also, such small groove portions 5 are formed so as to be connected at the linear passage portions 2a where the accumulation of water drops is more likely to occur, so that the growth of generated water drops can effectively be suppressed. Accordingly, in the fuel cell, the gas flow is stabilized by suppressing the blockage of the passages, by which power generation stabilization as well as improvement of flooding-resistant property can be achieved.

Also, the fuel cell of this embodiment is effective when applied especially to home-use fuel cells. Such home-use fuel cells are, in many cases, so designed that the motive power required for driving a pump or the like becomes as small as possible, and the gas supply flow rate within gas passages is suppressed so as to be relatively small (slow), compared with fuel cells for use in other fields (e.g., a gas supply flow rate of about 10 m/s or lower). Therefore, such a home-use fuel cell results in a relatively weak effect in discharging water drops generated within the gas passages by the gas flow rate, in which case it is more effective to suppress the growth of water drops by using such small groove portions as in the embodiment.

EXAMPLES

Next, several examples of the fuel cell of the above-described embodiment of the invention will be described below, in which effects of forming the small groove portions in the gas passages are explained.

First Example

The fuel-cell stack according to First Example is a stack 30 which is formed as shown in FIGS. 3A and 3B as described above. Structure and manufacturing method of the stack 30 of this First Example are explained.

First, fabrication process for the MEA 10 is explained. Acetylene black powder, on which 25 wt % of platinum particles having a mean particle size of about 30 Å was carried, was used as a catalyst for electrodes. Into a solution in which the catalyst powder was dispersed in isopropanol, a dispersion solution in which powder of perfluorocarbon sulfonic acid was dispersed in ethyl alcohol was mixed, by which a catalyst paste was obtained.

Meanwhile, a carbon nonwoven cloth (gas diffusion layer 14), which would serve as a base material for electrodes, was subjected to water repellency treatment. A carbon nonwoven cloth (made by Toray, TGP-H-120) having 14 cm×14 cm outer dimensions and a thickness of 36 μm was impregnated with a fluororesin-containing aqueous dispersion (made by Daikin Kogyo, NEOFLON ND1), thereafter being dried and heated at 400° C. for 30 minutes so as to be water repellent. The catalyst paste was applied onto one surface of the carbon nonwoven cloth 14 by screen printing process, by which catalytic layers 12, 13 were formed. In this case, the catalytic layers 12, 13 were partly buried in the carbon nonwoven cloth 14. The catalytic layers 12, 13 fabricated in this way and the carbon nonwoven cloth 14 were combined to form an electrode. The amount of platinum contained in the reactant electrode was controlled so as to become 0.6 mg/cm$^2$ and the amount of perfluorocarbon sulfonic acid was controlled so as to become 1.2 mg/cm$^2$ after its formation.

Next, a pair of electrodes (i.e., an anode-and-cathode pair of electrodes) were mated with front-and-rear surfaces of a proton-conductive polyelectrolyte membrane 11 having 15 cm×15 cm outer dimensions by hot pressing in such a manner that catalytic-layer-side surfaces of the electrodes would be brought into contact with those surfaces of the polyelectrolyte membrane 11, by which a membrane electrode assembly (MEA) 10 was obtained (see FIG. 2). As the proton-conductive polymer membrane 11 used in this case was a thin membrane of perfluorocarbon sulfonic acid thinned to a thickness of 30 μm.

Next, a method for fabricating electroconductive separators which would serve as the anode-side separator 1 and the cathode-side separator 41 is explained. First, with preparation of artificial graphite powder having a mean particle size of 50 to 100 μm, 80 wt % of the artificial graphite powder was kneaded with 20 wt % of thermosetting phenol resin by an extrusion kneader, by which kneaded powder was obtained. The resulting kneaded powder was thrown into a mold which had been heated to 180° C., the mold in use having configurations formed in correspondence to the configurations of fluid-passage use groove portions (gas-passage formation use grooves) 2, 42 for supply of the fuel fluid (fuel gas) and oxidizer fluid (oxidizer gas) as well as cooling-water-passage grooves (not shown) as well as individual manifolds 24-29 and small groove portions 5, 45, and the kneaded powder was compression-molded by hot pressing. It is noted that the method for this molding process may be not only compression molding but also injection molding or transfer molding, or otherwise only the small groove portions 5, 45 may be fabricated by cutting work.

The separator of this First Example is used in such a posture that its passage-formation surface is positioned along the vertical direction and that the individual linear passage portions 2a are positioned along the horizontal direction. With such a posture of use, it is preferable that the small groove portions 5 are formed in the passage portions positioned along the horizontal direction. As to the reason of this, a water drop will grow along gas-passage wall surfaces while moving along the flow direction. Therefore, in such a serpentine gas passage as shown in FIG. 3A, a water drop is easily movable along the gravitational direction, but less movable along a direction perpendicular to the gravitational direction. Whereas the water drop might grow in a passage having no small groove portions 5 enough to block the passage, the water-drop growth can be suppressed just to such an extent that it makes contact with the small groove portions 5 by virtue of the formation of the small groove portions 5 as in FIG. 3. It is noted that the cathode-side separator 41 was fabricated in a similar manner.

A cross-sectional shape of the small groove portions shown in FIGS. 3A, 3B and 4 was adopted. That is, the small groove portions 5, 45 were formed along the passages at generally central portions in bottom portions of the inner wall surfaces of the gas passages 2, 42.

The anode-side separator 1 with the small groove portions 5 formed therein and the cathode-side separator 41 with the small groove portions 45 formed therein were laid on each other with the MEA 10 and a gas sealing material interposed therebetween, by which a unit cell 20 was made up (see FIG. 2). In this First Example, inspecting portions on the anode and cathode side were coated with the gas sealing material so as not to be exposed to the surfaces. After this unit cell 20 was stacked each by 2 cells, the 2-cell layered cell was sandwiched by the separators having cooling water groove portions formed therein. This pattern was repeated until 10-cell layered stack 30 was fabricated. In this case, at both end portions of the stack 30 were placed stainless current-collector plates 21, insulating plates 22 made of an electrical insulating material and end plates 23, respectively, all of these members being fixed by a tightening rod. The tightening pressure in this case was set to 15 kgf/cm$^2$ per separator area.

The 10-cell-stack fuel cell (PEFC) 101 of this First Example fabricated in this way was held at 80° C., and hydrogen gas humidified to a dew point of 75° C. as fuel fluid (gas) was fed to the anode side while air humidified to a dew point of 65° C. as an oxidizer fluid (gas) was fed to the cathode side. As a result, under a no-load condition with no electric current outputted outside, a cell open-circuit voltage of 9.6 V was obtained. Measuring an internal resistance of the stack 30 as a whole in this case showed a value of about 4.5 mΩ.

Under the conditions of an oxygen use factor of 40% and a current density of 0.15 A/cm$^2$, the 10-cell-stack fuel cell 101 was operated with the fuel use factor incremented in steps of 5% from 50%. Then, the cell voltage, which was originally 700 mV or higher, abruptly decreased at a fuel use factor. When the cell voltage became lower than 600 mV, the test was ceased.

A 5-hour test operation was performed with the fuel use factor in steps of 5%, and the highest fuel use factor at which the operation was able to be done with all the cell voltages stable was taken as a limit fuel use factor (limit Uf).

Next, under the conditions of a fuel use factor of 60% and a current density of 0.3 A/cm$^2$, the 10-cell-stack fuel cell 101 was operated with the oxygen use factor incremented in steps of 5% from 30%. With respect to the oxygen use factor as well, when the cell voltage became lower than 600 mV, the test was ceased as in the case of the fuel use factor. A 5-hour test operation was performed with the oxygen use factor in steps of 5%, and the highest oxygen use factor at which the operation was able to be done with all the cell voltages stable was taken as a limit oxygen use factor (limit Uo). It can be said that the larger the limit fuel use factor (limit Uf) and the limit oxygen use factor (limit Uo) are, the higher the stability of the fuel cell is and the more successful its anti-flooding property is. That is, it can be said that by the suppression of passage blockage due to water drops generated in the gas passages of the separators, the stability of power generation can be enhanced and the anti-flooding property can be bettered achieved. The resulting values were taken as indices for the cell characteristic evaluation of fuel cells.

Cell characteristics of the 10-cell-stack fuel cell 101 with the separators 1, 41 in which the small groove portions 5, 45 were machined and formed in this First Example showed in all cases very high characteristics as much as a limit Uf of 80% and a limit Uo of 60%. It is noted that a fuel cell showing development of a limit Uf of 70% or higher and a limit Uo of 50% or higher can be said as a fuel cell (PEFC) having an excellent anti-flooding property in terms of cell characteristics. From these results, it can be considered that effects of the machining and formation of the small groove portions are well developed and the blockage due to produced water generated in the gas passages is effectively prevented.

Second Example

Figure 11A:
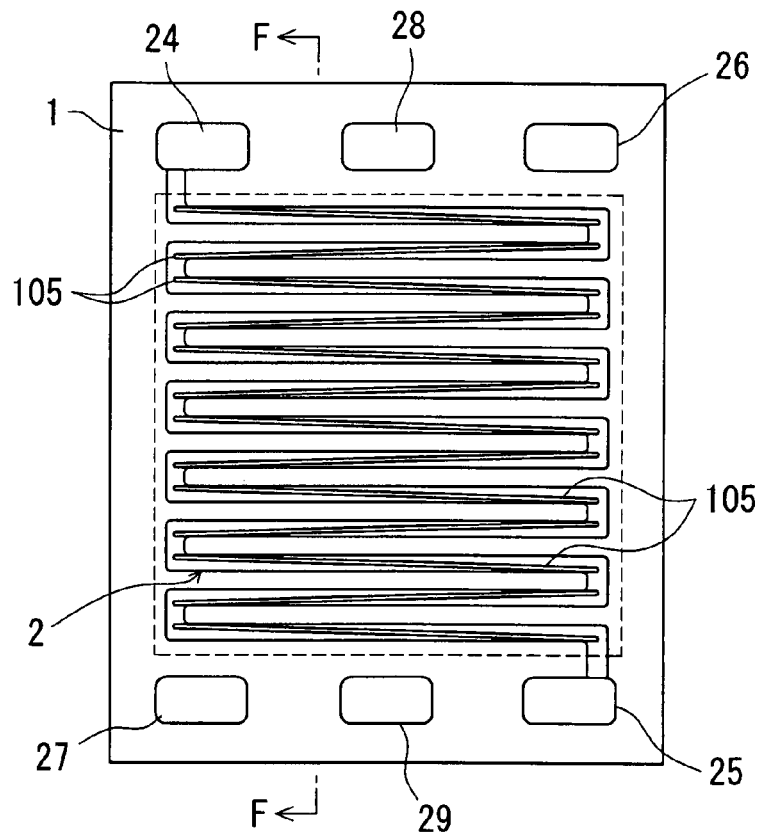
FIG. 11A is a sectional view of a unit cell according to a second example of the invention as viewed along arrows G-G.
Figure 11B:
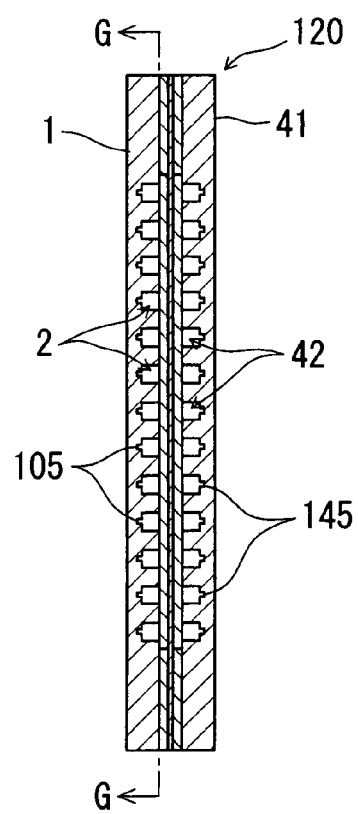
FIG. 11B is a sectional view of the unit cell of FIG. 11A as viewed along the line F-F.

Next, a schematic sectional view of a unit cell 120 in a fuel cell according to Second Example is shown in FIG. 11B, and a view taken along arrows G-G of FIG. 11B is shown in FIG. 11A. It is noted that a sectional view taken along arrows F-F in FIG. 11A corresponds to FIG. 11B. As shown in FIGS. 11A and 11B, the unit cell 120 of this Second Example, although having a structure generally similar to that of the unit cell 20 of the First Example, yet differs therefrom only in that small groove portions 105 are so formed so as to be slightly inclined with respect to the flow passage direction in the individual linear passage portions 2a. Also, the inclination direction of the small groove portions 105 is set to such a direction as to be decline with respect to the gas flow direction in the gas passages 2 as viewed in the figure. The small groove portions 105, 145 having such an inclination direction were formed in common between the anode-side and cathode-side separators. The construction and manufacturing method other than the points shown above are the same as those of the First Example and so their description is omitted.

The fuel cell of this Second Example constructed as described above was subjected to a cell power generation evaluation by the same method as applied in the First Example. As a result, the fuel cell showed performance results similar to those of the First Example. Further, a cell power generation evaluation was similarly done also with the cell temperature lowered by 5° C., from 80° C. to 75° C. In this case, while the limit use factor lowered in steps of 5% in the fuel cell of the First Example, unchanged performance results as a limit Uf of 80% and a limit Uo of 60% were developed in the fuel cell of this Second Example. From this result, it can be considered that by providing the small groove portions 105, 145 with an inclination that does not oppose the flow direction, the groove dischargeability from the small groove portions 105, 145 in the bent passage portions 2b can be further improved, so that stable cell characteristics were able to be obtained even under more supersaturated conditions.

Third Example

Figure 12A:
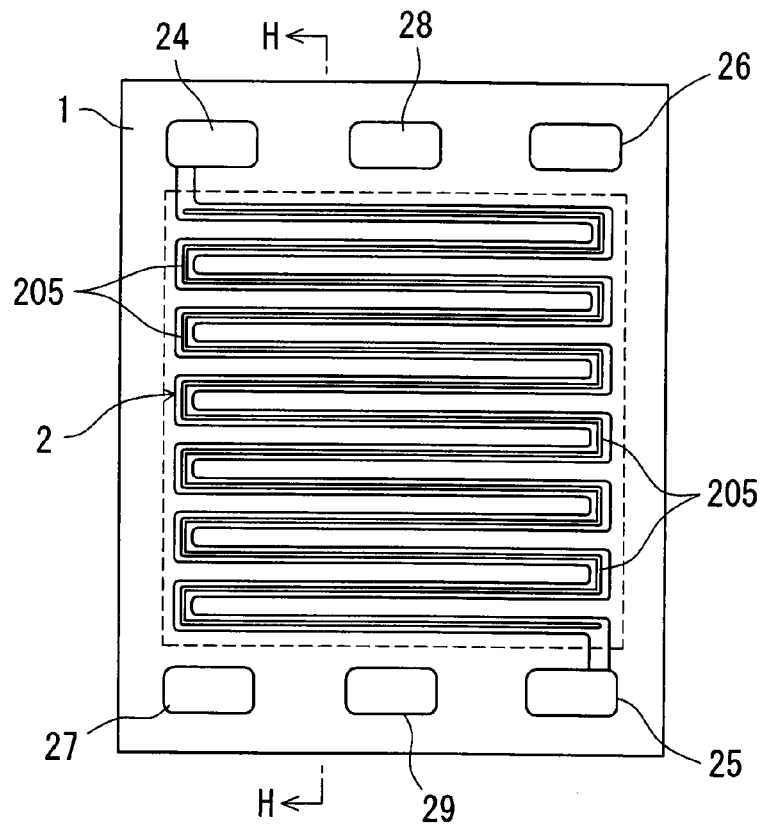
FIG. 12A is a sectional view of a unit cell according to a third example of the invention as viewed along arrows I-I.
Figure 12B:
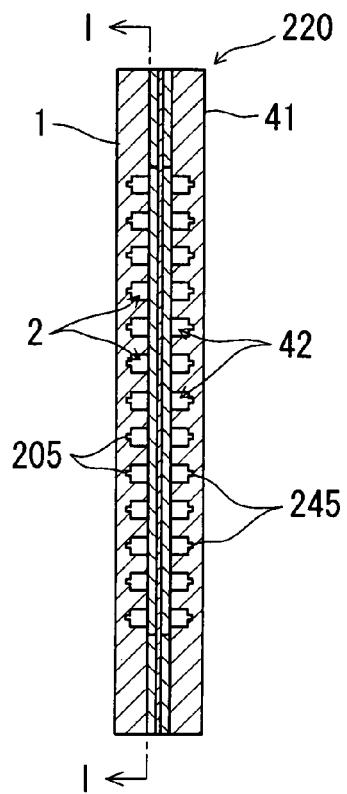
FIG. 12B is a sectional view of the unit cell of FIG. 12A as viewed along the line H-H.

Next, a schematic sectional view of a unit cell 220 in a fuel cell according to Third Example is shown in FIG. 12B, and a view taken along arrows I-I of FIG. 12B is shown in FIG. 12A. It is noted that a sectional view taken along arrows H-H in FIG. 12A corresponds to FIG. 12B. As shown in FIGS. 12A and 12B, the unit cell 220 of this Third Example, although having a structure generally similar to that of the unit cell 20 of the First Example, yet differs therefrom only in that small groove portions 205 formed in the individual linear passage portions 2a are communicated with one another in the individual bent passage portions 2b. These small groove portions 205 are not communicated with the inlet manifold 24 and the outlet manifold 25, so being in a discontinuous state. Such small groove portions 205, 245 were formed in common between the anode-side and cathode-side separators. The construction and manufacturing method other than the points shown above are the same as those of the First Example and so their description is omitted.

The fuel cell of this Third Example constructed as described above was subjected to a cell power generation evaluation by the same method as applied in the First Example. As a result, the fuel cell indeed showed high performance results as much as a limit Uf of 75% and a limit Uo of 55%, but those were each 5 points lower than in the First Example. Further, a cell power generation evaluation was similarly done also with the cell temperature lowered by 5° C., from 80° C. to 75° C. In this case, while the limit use factor lowered in steps of 5% in the fuel cell of the First Example, unchanged performance results as a limit Uf of 80% and a limit Uo of 60% were developed in the fuel cell of this Third Example. From this result, it can be considered that by coupling the small groove portions 205, 245 at the bent passage portions 2b, stable cell characteristics can be obtained under more supersaturated conditions.

Fourth Example

Figure 13A:
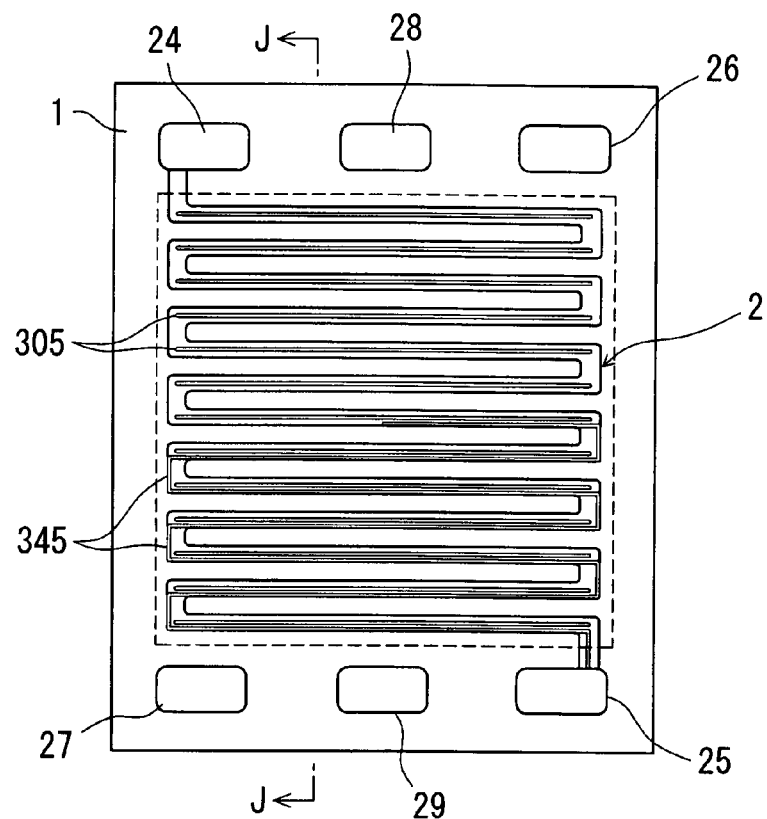
FIG. 13A is a sectional view of a unit cell according to a fourth example of the invention as viewed along arrows K-K.
Figure 13B:
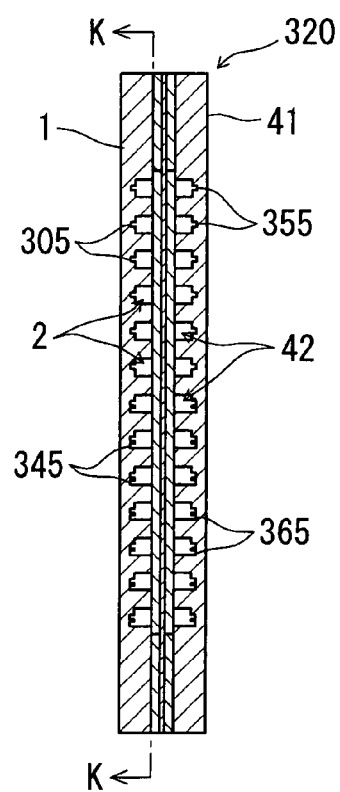
FIG. 13B is a sectional view of the unit cell of FIG. 13A as viewed along the line J-J.

Next, a schematic sectional view of a unit cell 320 in a fuel cell according to Fourth Example is shown in FIG. 13B, and a view taken along arrows K-K of FIG. 13B is shown in FIG. 13A. It is noted that a sectional view taken along arrows J-J in FIG. 13A corresponds to FIG. 13B. As shown in FIGS. 13A and 13B, the unit cell 320 of this Fourth Example, although having a structure generally similar to that of the unit cell 20 of the First Example, yet differs therefrom in that second small groove portions 355 are formed in downstream (second half) part of the gas passage portions 2a. These second small groove portions 355 are formed not only in the linear passage portions 2a but also in the bent passage portions 2b, so as to be finally communicated with the outlet manifold 25. Meanwhile, small groove portions (i.e., first small groove portions) 305 formed in the individual linear passage portions 2a are not formed in the bent passage portions 2b, and not communicated with the outlet manifold 25. Such small groove portions 305, 355, 345 and 365 were formed in common between the anode-side and cathode-side separators. The construction and manufacturing method other than the points shown above are the same as those of the First Example and so their description is omitted.

The fuel cell of this Fourth Example constructed as described above was subjected to a cell power generation evaluation by the same method as applied in the First Example. As a result, the fuel cell indeed showed high performance results as much as a limit Uf of 80% and a limit Uo of 60%, equivalent to those of the First Example. Further, a cell power generation evaluation was similarly done also with the cell temperature lowered by 10° C., from 80° C. to 70° C. In this case, unchanged performance results as a limit Uf of 80% and a limit Uo of 60% were developed. From this result, it can be considered that even more stable cell characteristics can be obtained over a wide range of operating conditions with the fuel cell of this Fourth Example.

As described hereinabove, according to the present invention, growth of condensed water (produced water) can be suppressed in the gas passages in the individual unit cells so that gas passages can be ensured with reliability. Therefore, it becomes practicable to make up a fuel cell that is enabled to fulfill stable power generation with the occurrence of flooding suppressed.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2005-140915 filed on May 13, 2005, including specification, drawings, and claims, are incorporated herein by reference in its entirety.

The invention claimed is:

1. A fuel cell comprising:
a membrane electrode assembly which is a composite member of a polyelectrolyte membrane, catalytic layers placed so as to sandwich the polyelectrolyte membrane, and gas diffusion layers placed outside the catalytic layers, respectively, and in which anode and cathode electrodes are formed; and
a pair of separators in which gas-passage groove portions are so formed that their surfaces are brought into contact with the gas diffusion layers to form a gas passage, and which are so placed as to sandwich the membrane electrode assembly, wherein
in each of the separators,
the gas passage comprises a plurality of generally linear passage portions disposed generally in parallel to one another, and a plurality of bent passage portions which make end portions of the linear passages communicated with end portions of their adjacent linear passage portions, where the gas-passage groove portions are formed so as to be communicative from a gas feed port to a discharge port, and wherein
in inner wall surfaces of the gas-passage groove portions constituting each of the linear passage portions, water-retaining groove portions for retaining inside thereof at least part of water generated in the gas passage are formed in such a grooved configuration as to be substantially continuous along the linear passage portion, and so as not to communicate with the discharge port.

2. A fuel cell comprising:
a membrane electrode assembly which is a composite member of a polyelectrolyte membrane, catalytic layers placed so as to sandwich the polyelectrolyte membrane, and gas diffusion layers placed outside the catalytic layers, respectively, and in which anode and cathode electrodes are formed; and
a pair of separators in which gas-passage groove portions are so formed that their surfaces are brought into contact with the gas diffusion layers to form a gas passage, and which are so placed as to sandwich the membrane electrode assembly, wherein
in each of the separators,
the gas passage comprises a plurality of generally linear passage portions disposed generally in parallel to one another, and a plurality of bent passage portions which make end portions of the linear passages communicated with end portions of their adjacent linear passage portions, where the gas-passage groove portions are formed so as to be communicative from a gas feed port to a discharge port, and wherein
in inner wall surfaces of the gas-passage groove portions constituting each of the linear passage portions, water-retaining groove portions for retaining inside thereof at least part of water generated in the gas passage are formed in such a grooved configuration as to be substantially continuous along the linear passage portion,
wherein the water-retaining groove portions are formed so as to be continued between the both end portions thereof in each of the linear passage portions, and the water-retaining groove portions are discontinuous with at least a part of the bent passage portions.

3. The fuel cell as defined in claim 1, wherein the water-retaining groove portions are formed at bottom portions of the gas-passage groove portions, respectively.

4. The fuel cell as defined in claim 3, wherein the water-retaining groove portions are formed at generally central portions of the bottom portions, respectively.

5. The fuel cell as defined in claim 1, wherein the water-retaining groove portions are formed so as to bring a water drop generated within the gas-passage groove portions into contact with the retained water and thereby decrease a contact angle between an inner wall surface of the gas-passage groove portions and the water drop.

6. The fuel cell as defined in claim 1, wherein the water-retaining groove portions are so formed as to each have a width falling within a range of ½ to ¹/₁₀ of a width of each of the groove portions.

7. The fuel cell as defined in claim 2, wherein the water-retaining groove portions are formed at bottom portions of the gas-passage groove portions, respectively.

8. The fuel cell as defined in claim 7, wherein the water-retaining groove portions are formed at generally central portions of the bottom portions, respectively.

9. The fuel cell as defined in claim 2, wherein the water-retaining groove portions are formed so as to bring a water drop generated within the gas-passage groove portions into contact with the retained water and thereby decrease a contact angle between an inner wall surface of the gas-passage groove portions and the water drop.

10. The fuel cell as defined in claim 2, wherein the water-retaining groove portions are so formed as to each have a width falling within a range of ½ to ¹/₁₀ of a width of each of the groove portions.

* * * * *